(12) United States Patent
Chen et al.

(10) Patent No.: US 10,154,424 B2
(45) Date of Patent: Dec. 11, 2018

(54) CSI MEASUREMENT UNDER COVERAGE ENHANCEMENTS IN LTE

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 14/997,665

(22) Filed: Jan. 18, 2016

(65) Prior Publication Data

US 2016/0227424 A1    Aug. 4, 2016

Related U.S. Application Data

(60) Provisional application No. 62/110,304, filed on Jan. 30, 2015.

(51) Int. Cl.
*H04W 24/08* (2009.01)
*H04L 5/00* (2006.01)

(52) U.S. Cl.
CPC .......... *H04W 24/08* (2013.01); *H04L 5/0048* (2013.01); *H04L 5/0053* (2013.01)

(58) Field of Classification Search
CPC ..... H04W 24/08; H04L 5/0048; H04L 5/0053
See application file for complete search history.

(56) References Cited

U.S. PATENT DOCUMENTS

| | | | | |
|---|---|---|---|---|
| 2013/0250924 | A1* | 9/2013 | Chen | H04L 1/1819 370/336 |
| 2013/0315114 | A1 | 11/2013 | Seo et al. | |
| 2014/0198677 | A1* | 7/2014 | Xu | H04L 1/0026 370/252 |
| 2014/0211770 | A1* | 7/2014 | Englund | H04L 1/0026 370/336 |
| 2014/0301231 | A1 | 10/2014 | Hooli et al. | |

OTHER PUBLICATIONS

ISA/EPO, International Search Report and Written Opinion of the International Searching Authority, Int'l. App. No. PCT/US2016/013895, dated Apr. 1, 2016, European Patent Office, Rijswijk, NL, 11 pgs.

* cited by examiner

*Primary Examiner* — Melvin C Marcelo
(74) *Attorney, Agent, or Firm* — Holland & Hart LLP

(57) ABSTRACT

Methods and systems are disclosed for determining channel state information (CSI) when received uplink grants occupy a plurality of subframes and include a transmission time interval (TTI) bundle. Based at least in part on a configuration of the received TTI bundle, one or more subframes may be identified as CSI reference subframes to be used for CSI measurement. The CSI reference subframes may correspond to subframes or sub-bands used by the received uplink grant, or may be a predefined number of subframes before a CSI data transmission.

70 Claims, 15 Drawing Sheets

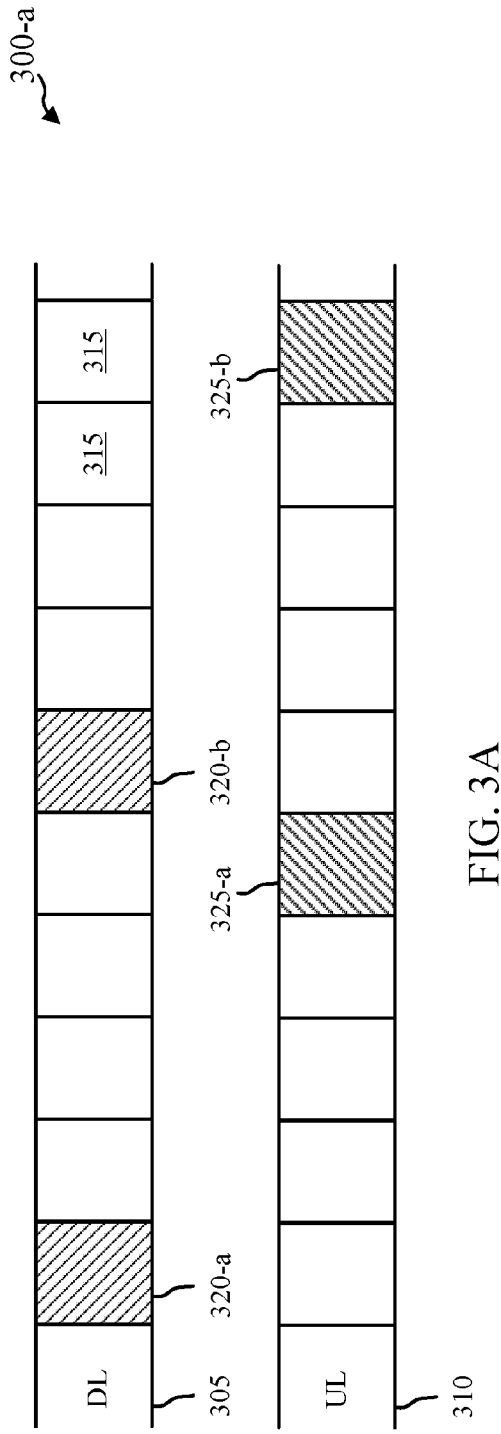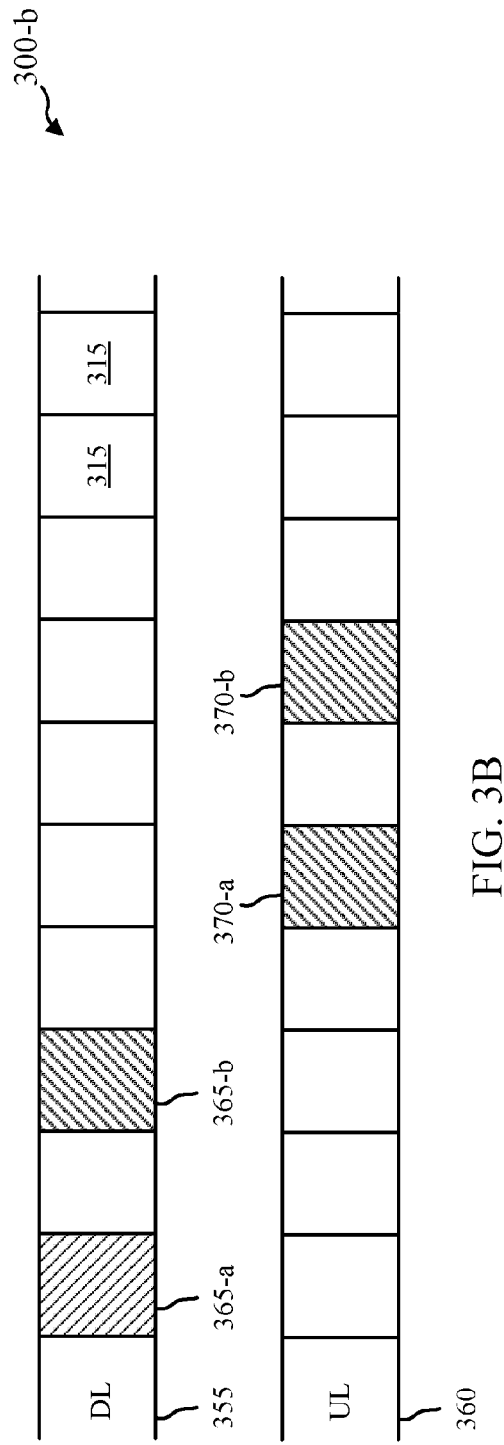
FIG. 3A
FIG. 3B

CSI MEASUREMENT UNDER COVERAGE ENHANCEMENTS IN LTE

CROSS REFERENCES

The present application for patent claims priority to U.S. Provisional Patent Application No. 62/110,304 by Chen et al., entitled "CSI Measurement Under Coverage Enhancements In LTE," filed Jan. 30, 2015, assigned to the assignee hereof.

BACKGROUND

Field of the Disclosure

The present disclosure, for example, relates to wireless communication systems, and more particularly to determining channel state information (CSI) data when an uplink grant is received across more than one subframe.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In some cases, a UE may report CSI data to a base station on an uplink channel. The CSI data may be based on CSI measurements performed using a CSI reference subframe. In many cases, the CSI reference subframe coincides with a subframe on which an uplink grant is transmitted from a base station to a UE. However, in some circumstances, an uplink grant may be transmitted to a UE across more than one subframe. Procedures for determining CSI data when an uplink grant is received across multiple subframes may be beneficial.

SUMMARY

A user equipment (UE) may be configured to report channel state information (CSI) data to a base station. The CSI data may be reported periodically or in response to a request received from the base station (e.g., aperiodically). The reported CSI data may be determined by a UE using one or more CSI reference subframes. In instances where the UE receives an uplink grant across multiple subframes (as in, for example, a coverage enhancement situation), the UE may determine which subframe or subframes to use as CSI reference subframes. In certain circumstances, the UE may use a last subframe of a transmission time interval (TTI) bundle of the uplink grant as the CSI reference subframe. In certain circumstances, the UE may use two or more subframes of the TTI bundle of the uplink grant as CSI reference subframes. When multiple CSI reference subframes are used, the UE may average the CSI measurements across each of the multiple CSI reference subframes in order to determine the CSI data to be reported. When the uplink grant is received across multiple subframes and multiple sub-bands, the CSI reference subframes used by the UE may include subframes of the TTI bundle that are on any or all of the sub-bands.

In a first set of illustrative embodiments, a method for wireless communication is disclosed. The method may include receiving an uplink grant in a plurality of subframes comprising a TTI bundle. The method may also include identifying, based at least in part on a configuration of the TTI bundle, one or more subframes as CSI reference subframes to be used for CSI measurement. Once the CSI reference subframes have been identified, the method may include performing CSI measurement of the CSI reference subframes, and transmitting CSI data based at least in part on the CSI measurement.

In a second set of illustrative embodiments, an apparatus for wireless communication is disclosed. The apparatus may include means for receiving an uplink grant in a plurality of subframes comprising a TTI bundle. The apparatus may also include means for identifying, based at least in part on a configuration of the TTI bundle, one or more subframes as CSI reference subframes to be used for CSI measurement. In addition, the apparatus may also include means for performing CSI measurement of the CSI reference subframes, and means for transmitting CSI data based at least in part on the CSI measurement.

In a third set of illustrative embodiments, an apparatus for wireless communication may be disclosed. The apparatus may include a processor, memory in electronic communication with the processor, and instructions stored in the memory. The instructions may be executable by the processor to receive an uplink grant in a plurality of subframes comprising a TTI bundle. The instructions may also be executable by the processor to identify, based at least in part on a configuration of the TTI bundle, one or more subframes as CSI reference subframes to be used for CSI measurement. Further, the instructions may be executable by the processor to perform CSI measurement of the CSI reference subframes, and to transmit CSI data based at least in part on the CSI measurement.

In a fourth set of illustrative embodiments, a non-transitory computer-readable medium storing computer-executable code for wireless communication may be disclosed. The code may be executable by a processor to receive an uplink grant in a plurality of subframes comprising a TTI bundle. The code may also be executable by the processor to identify, based at least in part on a configuration of the TTI bundle, one or more subframes as CSI reference subframes to be used for CSI measurement. Additionally, the code may be executable by the processor to perform CSI measurement of the CSI reference subframes, and to transmit CSI data based at least in part on the CSI measurement.

Aspects of the various illustrative embodiments may include identifying a last valid subframe of the TTI bundle as a CSI reference subframe. Other aspects may include identifying two or more valid subframes in the TTI bundle as CSI reference subframes. As an example, all of the subframes in the TTI bundle may be identified as CSI reference subframes. Additional aspects of the various illustrative embodiments may include identifying a latest valid subframe that is at least a predetermined number of subframes earlier than a subframe used to transmit the CSI data, wherein a gap between the latest valid subframe and the subframe used to transmit the CSI data includes at least one subframe that does not carry the uplink grant.

In some aspects, the configuration of the TTI bundle is such that the TTI bundle may be received on a single sub-band. In additional aspects, a physical downlink shared channel (PDSCH) bundle may be received on a first sub-band and the uplink grant may be received on a second sub-band. Alternatively, the configuration of the TTI bundle is such that the TTI bundle may be received as two or more TTI sub-bundles across a corresponding two or more sub-bands.

In situations where the TTI bundle is received as two or more TTI sub-bundles across a corresponding two or more sub-bands, the aspects of the disclosure may include identifying a last valid subframe of a last TTI sub-bundle as a CSI reference subframe. The aspects of the disclosure may also include identifying a last valid subframe of each of the TTI sub-bundles as CSI reference subframes, and averaging CSI measurements performed over each of the CSI reference subframes. The aspects of the disclosure may also include identifying two or more valid subframes within the two or more TTI sub-bundles as CSI reference subframes, and averaging CSI measurements performed over each of the CSI reference subframes. The aspects of the disclosure may also include identifying all of the subframes within the two or more TTI sub-bundles as CSI reference subframes, and averaging CSI measurements performed over each of the CSI reference subframes. Additionally, the aspects of the disclosure may include identifying a latest valid subframe that is at least a predetermined number of subframes earlier than a subframe used to transmit the CSI data, wherein a gap between the latest valid subframe and the subframe used to transmit the CSI data includes at least one subframe that does not carry the uplink grant.

In some aspects, transmitting CSI data based at least in part on the CSI measurement may include transmitting periodic-CSI (P-CSI) data based in part on a P-CSI configuration that includes a periodicity or offset for P-CSI data transmission, and modifying the P-CSI configuration based on a bundling size of an uplink transmission associated with the uplink grant. In other aspects, transmitting CSI data based at least in part on the CSI measurement may include transmitting aperiodic-CSI (A-CSI) data based in part on an A-CSI configuration that identifies a scheme for identifying the CSI reference subframes to be used for CSI measurement.

Some aspects may additionally include receiving a bundled non-zero power (NZP) CSI reference signal (CSI-RS) for channel measurement across multiple subframes of the TTI bundle. Other aspects may additionally include receiving a bundled interference measurement resource (IMR) for interference measurement across multiple subframes of the TTI bundle.

In certain aspects, the identified CSI reference subframes are determined to be valid. This may be done by determining that the CSI reference subframes are on sub-bands on which a PDSCH bundle is received. This may also be done by excluding at least one of a multicast broadcast single frequency network (MBSFN) subframe, a special subframe with a short downlink portion, a subframe associated with a different CSI subframe set, or a subframe of a different sub-band. This may further be done by determining that the CSI reference subframes are on sub-bands to be used during narrow bandwidth operations.

In certain aspects, the TTI bundle may be received in accordance with a coverage enhancement technique. In other aspects, the TTI bundle may be received at a machine type communication (MTC) UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 3A and 3B show example timelines for CSI reporting, in accordance with various aspects of the present disclosure;

DETAILED DESCRIPTION

Figure 1:
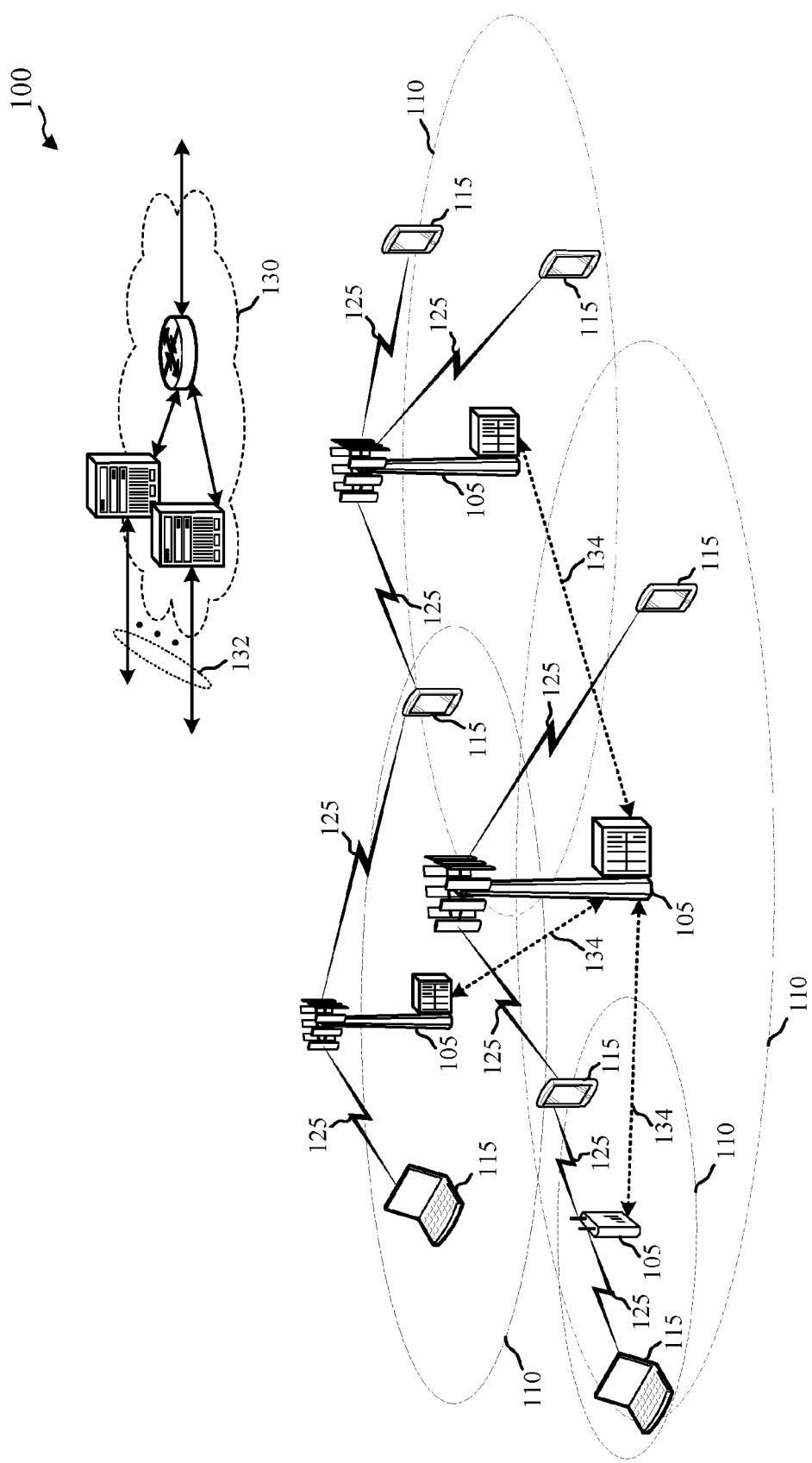
FIG. 1 shows a block diagram of a wireless communication system, in accordance with various aspects of the present disclosure.

A base station may communicate with a user equipment (UE) by receiving uplink transmissions from the UE and by sending downlink transmissions to the UE. In certain circumstances, the base station may select a downlink transmission configuration based on a downlink channel condition. The downlink channel condition may be reported to the base station by a UE in the form of channel state information (CSI) data. Downlink channel conditions may be determined based on measurements taken on a downlink channel during a particular downlink subframe, which may be referred to as a CSI reference subframe. A UE may report CSI data to the base station periodically or in response to specific requests from the base station (e.g., aperiodically). Both periodic CSI (P-CSI) data and aperiodic CSI (A-CSI) data may be generated by the UE in consideration of specific CSI reference subframes. The UE may identify one or more subframes to use as CSI reference subframes. To be of most use, however, the identified CSI reference subframes may coincide with downlink channels on which the base station is to transmit a downlink transmission. For example, the identified CSI reference subframes may correspond to those used for transmission of an uplink grant from the base station.

However, in certain circumstances, an uplink grant may be transmitted from a base station to a UE across more than one subframe. In other circumstances, an uplink grant may be transmitted from a base station to a UE across multiple subframes and across multiple sub-bands. In one example, these circumstances may arise when a base station is communicating with UEs that have limited communication options. As an example, the base station may be operating under a coverage enhancement situation. Coverage enhancement operations generally include ways to increase effectiveness of communications with devices operating under certain constraints. These constraints may include remote or distant locations, power limitations, reception capability, and the like. Coverage enhancement operations may include repetition of transmissions within subframes, repetition of transmissions across different subframes, power boosting, beamforming, spatial multiplexing, or the like. Coverage enhancement operations may also include bundling of transmissions across multiple subframes and/or across multiple sub-bands. Coverage enhancement operations may also be employed for machine-type communication (MTC) applications or UEs.

MTC and/or machine-to-machine (M2M) communication may refer to data communication technologies that allow devices to communicate with one another or a base station without human intervention. For example, MTC may refer to communications from devices that integrate sensors or meters to measure or capture information and relay that information to a central server or application program that can make use of the information or present the information to humans interacting with the program or application. In many cases, MTC devices are power constrained. For example, MTC devices may have limited power or may be positioned in locations that are difficult to wirelessly access. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Thus, in coverage enhancement situations such as during communications between a base station and an MTC UE, a base station may use bundling, for example, in order to improve communications between the base station and the MTC UE. The base station may also require CSI data from the UE. The UE, however, may be required to identify one or more CSI reference subframes to generate the CSI data. Because the base station may be using multiple subframes and/or sub-bands to communicate with the UE, the CSI reference subframes identified by the UE may beneficially correspond to certain ones of the subframes and/or sub-bands used (for example, during transmission of an uplink grant).

Therefore, as explained in greater detail below, a UE may use a last subframe of a transmission time interval (TTI) bundle of an uplink grant as the CSI reference subframe. In certain circumstances, the UE may use two or more subframes of the TTI bundle of the uplink grant as CSI reference subframes. When multiple CSI reference subframes are used, the UE may average the CSI measurements across each of the multiple CSI reference subframes in order to determine the CSI data to be reported. When the uplink grant is received across multiple subframes and multiple sub-bands, the CSI reference subframes used by the UE may include subframes of the TTI bundle that are on any or all of the sub-bands.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100 in accordance with various aspects of the disclosure. The wireless communication system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, evolved NodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 is a Long-Term Evolution (LTE) or LTE-Advanced (LTE-A) network. In LTE/LTE-A networks, the term eNB may be generally used to describe the base stations 105, while the term UE may be generally used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

In some examples, the UEs 115 may be low-cost or MTC UEs, and may be categorized as a category 0 in an LTE/LTE-A network. Category 0 UEs may be limited due to various power constraints or simplifications in design. For example, a category 0 UE may be limited by reduced peak data rates. As one example, a category 0 UE may be capped at 1000 bits per transport block size. A category 0 UE may be limited to rank 1 transmissions, meaning that the UE may only be able to participate in one transmission at a time. A category 0 UE may be limited in a number of antennas configured for use by the UE. For example, a category 0 UE may only have one antenna. If configured for half-duplex operation, a category 0 UE may also have relaxed switching timing requirements (from, for example, transmit (Tx) to receive (Rx), or from Rx to Tx). For example, a non-category 0 UE may have a switching timing requirement of 20 μs, while a category 0 UE may have a switching timing requirement of 1 ms.

Nevertheless, the UEs 115, whether category 0 UEs or non-category 0 UEs, may still monitor downlink control channels, including the monitoring of wideband control channels, physical downlink control channel (PDCCH) and enhanced physical downlink control channel (EPDCCH), for example. Additionally, enhanced MTC (eMTC) UEs may be capable of narrowband operation in a wider system bandwidth (for example, 1.4/3/5/10/15/20 MHz bandwidths). For example, an eMTC UE may be able to operate on a 1.4 MHz bandwidth (e.g., a bandwidth that is 6 resource blocks (RBs) wide). Support for eMTC UEs may include coverage enhancements resulting in up to 15 dB signal gains.

Therefore, UEs 115 may include both category 0 UEs (such as MTC UEs and eMTC UEs) and non-category 0 UEs. UEs 115 may include other categories of UEs as well.

The communication links 125 shown in wireless communication system 100 may include uplink transmissions from a UE 115 to a base station 105, and/or downlink transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD)

operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communication system 100 may support the transmission of CSI data from the UEs 115 to the base stations 105. Non-category 0 UEs may support both P-CSI data transmission and A-CSI data transmission. Category 0 UEs may also support at least one of P-CSI data transmission or A-CSI data transmission. Therefore, the UEs 115 may be configured to perform subframe set-based CSI feedback. In certain examples, for example during enhanced inter-cell interference coordination (eICIC) or enhanced interference mitigation and traffic adaptation (eIMTA), a UE 115 may be configured with two subframe sets such that CSI data is reported separately for the two subframe sets.

Figure 2:
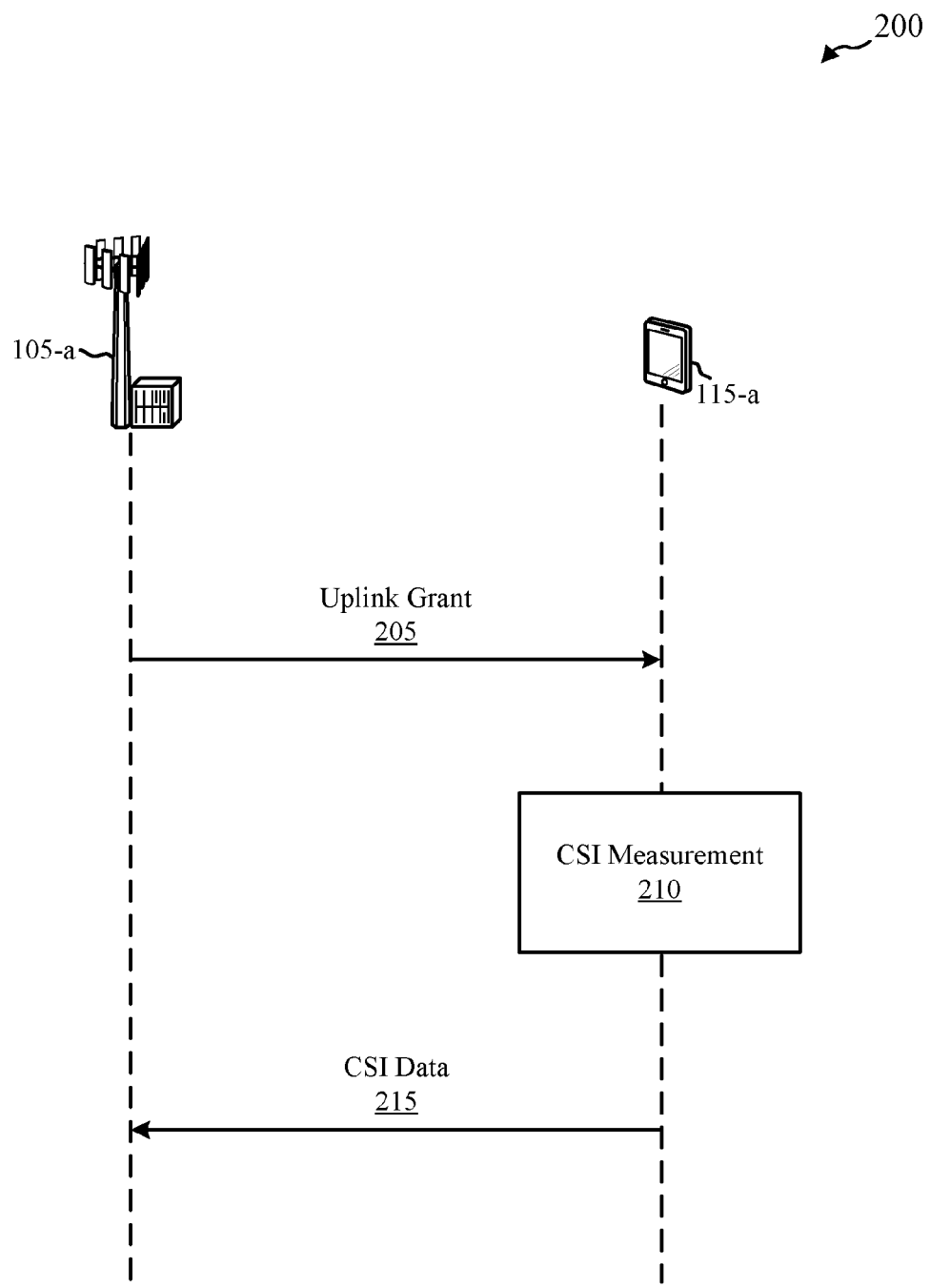
FIG. 2 shows a channel state information (CSI) communication flow diagram, in accordance with various aspects of the present disclosure.

FIG. 2 shows a CSI communication flow diagram 200, in accordance with various aspects of the present disclosure. The communications in FIG. 2 are between a base station 105-a and a UE 115-a. Base station 105-a may be an example of the base stations 105 illustrated in FIG. 1. UE 115-a may be an example of the UEs 115 illustrated in FIG. 1. Thus, UE 115-a may be an MTC UE, a category 0 UE, a non-category 0 UE, etc.

In flow diagram 200, the base station 105-a transmits an uplink grant 205 to the UE 115-a. The uplink grant 205 may be included in a PDCCH or, in some cases, in a physical downlink shared channel (PDSCH). The uplink grant 205 may be transmitted across more than one subframe and may include a TTI bundle that includes multiple subframes. In some embodiments, the TTI bundle may be split into two or more TTI sub-bundles and may be transmitted across multiple sub-bands. The transmission of the uplink grant 205 across more than one subframe and/or sub-band may be a result of a coverage enhancement operation and may be beneficial for UE 115-a when, for example, UE 115-a is an MTC UE.

After receiving the uplink grant 205, the UE 115-a may perform a CSI measurement, at block 210 in order to determine CSI data 215 to be transmitted to the base station 105-a. Typical CSI measurement techniques are described with reference to FIGS. 3A and 3B, below. In each scenario, the UE 115-a identifies a CSI reference subframe to use for measurement. Typically, the CSI reference subframe occurs 4 ms before the reporting subframe (i.e., the subframe used to transmit the CSI data from the UE 115-a to the base station 105-a). In A-CSI feedback, the CSI reference subframe is typically the same subframe in which the uplink grant is transmitted (i.e., the uplink grant that schedules the corresponding physical uplink shared channel (PUSCH) transmission).

The CSI reference subframe may include either a cell-specific reference signal (CRS) or a CSI reference signal (CSI-RS). The CRS or CSI-RS may be used to aid the UE 115-a in channel measurement and in generating CSI data. Similarly, the CSI reference subframe may also include an interference measurement resource (IMR). CRS and IMR may be used to aid the UE 115-a in interference measurement.

Some subframes, however, may not be valid for measurement or for use as CSI reference subframes. For example, special subframes that have a short downlink pilot time slot (DwPTS) may not be long enough to include a CRS and so may not be valid as CSI reference subframes. Additionally, a multicast broadcast single frequency network (MBSFN) subframe may also not be able to include a CRS and thus may not be valid as a CSI reference subframe. In certain cases, two or more CSI subframe sets may be configured. The set of downlink subframe(s) associated with each CSI subframe set may be expected to have different interference characteristics. In order to be a valid CSI reference subframe, a downlink subframe may be in the same subframe set as the corresponding reported CSI subframe set. As another example, if IMR is used for interference measurement for a CSI report, a valid downlink subframe for CSI measurement may also contain an IMR.

Although a single CSI reference subframe is required for CSI measurement, UE 115-a may typically use multiple subframes for CSI measurement in order to improve reporting accuracy and reliability. Measurements taken across multiple CSI reference subframes may be averaged, for example, in order to provide an overall CSI measurement.

FIG. 3A shows an example timeline 300-a for CSI reporting, in accordance with various aspects of the present disclosure. Timeline 300-a includes a downlink timeline 305 and an uplink timeline 310. The downlink timeline 305 illustrates relative timing of transmissions from a base station, such as base stations 105 of FIG. 1 or 2, while the uplink timeline 310 illustrates relative timing of transmissions from a UE, such as UEs 115 of FIG. 1 or 2. The downlink timeline 305 and the uplink timeline 310 are divided into subframes 315.

The timeline 300-a illustrates an example of P-CSI reporting. As stated above, typical CSI reporting occurs 4 ms after the occurrence of the CSI reference subframe. This is the case in timeline 300-a. In timeline 300-a, P-CSI reporting subframe 325-a occurs 4 subframes after a corresponding CSI reference subframe 320-a. Similarly, P-CSI reporting subframe 325-b occurs 4 subframes after a corresponding CSI reference subframe 320-b. The subframes 315 in timeline 300-a may be approximately 1 ms in length. Although not shown, if the subframe 4 ms before a CSI reporting subframe is not a valid subframe (e.g., the subframe is an uplink subframe in a TDD configuration), the CSI reference subframe for the CSI reporting subframe can be a latest valid downlink subframe 5 ms or earlier before the CSI reporting subframe.

In more general terms, the P-CSI reporting subframe 325 may use as a CSI reference subframe 320 a subframe 315 that is n subframes before the P-CSI reporting 325, where n is a integer that is typically equal to or greater than four. The integer n may sometimes be referred to as n_{CSI, Ref}.

FIG. 3B shows an example timeline 300-b for CSI reporting, in accordance with various aspects of the present disclosure. Timeline 300-b includes a downlink timeline 355 and an uplink timeline 360. The downlink timeline 355 illustrates relative timing of transmissions from a base station, such as base stations 105 of FIG. 1 or 2, while the uplink timeline 360 illustrates relative timing of transmissions from a UE, such as UEs 115 of FIG. 1 or 2. The downlink timeline 355 and the uplink timeline 360 are divided into subframes 315.

The timeline 300-b illustrates an example of A-CSI reporting. As stated above, typical A-CSI reporting subframe uses as a CSI reference subframe a subframe 315 in which a corresponding uplink grant is transmitted. Thus, in timeline 300-b, A-CSI reporting subframe 370-a includes a PUSCH transmission allowed by the uplink grant 365-a, whose subframe is also used as the CSI reference subframe for the A-CSI reporting subframe 370-a. Similarly, A-CSI reporting subframe 370-b includes a PUSCH transmission allowed by the uplink grant 365-b, whose subframe is also used as the CSI reference subframe for the A-CSI reporting subframe 370-b.

While the examples shown in FIGS. 3A and 3B may be sufficient when an uplink grant is conveyed on a single subframe, additional options for identifying a CSI reference subframe may be beneficial when an uplink grant is transmitted across multiple subframes, as may occur during a coverage enhancement situation, as described above with respect to FIG. 1. During coverage enhancement, an uplink grant scheduling PUSCH transmission may be transmitted using multiple downlink subframes. Additionally, a PDSCH transmission (including uplink and downlink grants) may hop over different sub-bands. As an example, each sub-band may be subject to a 6 RB bandwidth limitation, and the hopping sequence may be predefined for each channel. Nevertheless, the result is that an uplink grant may be transmitted across multiple subframes and/or sub-bands. CSI feedback in these situations may be adjusted in order to accurately reflect the channel and interference measurements on the subframes and sub-bands used for the uplink grants.

In determining which subframes and sub-bands to use as CSI reference subframes, the following factors may be considered. First, bundled PDSCH transmissions for the same transmission block may hop over different sub-bands, and such hopping may be pre-defined. As a result, CSI reporting is preferably based on measurements made over the sub-bands that PDSCH is hopped over. Second, if there is TTI bundling for an uplink grant transmission, CSI reporting is preferably based on one or more subframes from the set of subframes on which the uplink grant was transmitted. And third, a subframe selected as a CSI reference subframe should also be a valid CSI reference subframe.

A CSI reference subframe may be valid for CSI measurement if it is able to include a CRS, for example. Thus, DwPTS subframes and MBSFN subframes may not be valid CSI reference subframes. A CSI reference subframe may also be valid for CSI measurement if it is in the same subframe set used for the transmission of an uplink grant. Additionally, for MTC UEs, sub-band may act as an additional factor. For example, if an MTC UE is tuned to a sub-band that is different from the sub-band for which the CSI is intended to report, then the subframe is not valid for CSI measurement.

Therefore, CSI reference subframe selection may be dependent on whether an uplink grant is transmitted across multiple subframes, whether an uplink grant is transmitted across multiple subframes and sub-bands, and whether individual subframes are valid for CSI measurement.

In one aspect of the disclosure, CSI reference subframe selection is considered when an uplink grant is transmitted across multiple subframes but on a single sub-band (i.e., in a situation with no sub-band hopping).

In this situation, P-CSI reporting may function as outlined above with respect to FIG. 3A. That is, a P-CSI reporting subframe may be selected in accordance with a P-CSI configuration (defining, for example, the periodicity and offset of the P-CSI reporting subframe). A CSI reference subframe may then be selected a pre-defined number of subframes n before the P-CSI reporting subframe. In an example, n may be four or more subframes. The selected CSI reference subframe must also be valid for CSI measurements. Therefore, if the subframe that is n subframes before the P-CSI reporting subframe is not valid for CSI measurement, then the n+1 subframe (the subframe that is n+1 subframes before the P-CSI reporting subframe) may be considered and used if it is valid.

Figure 4:
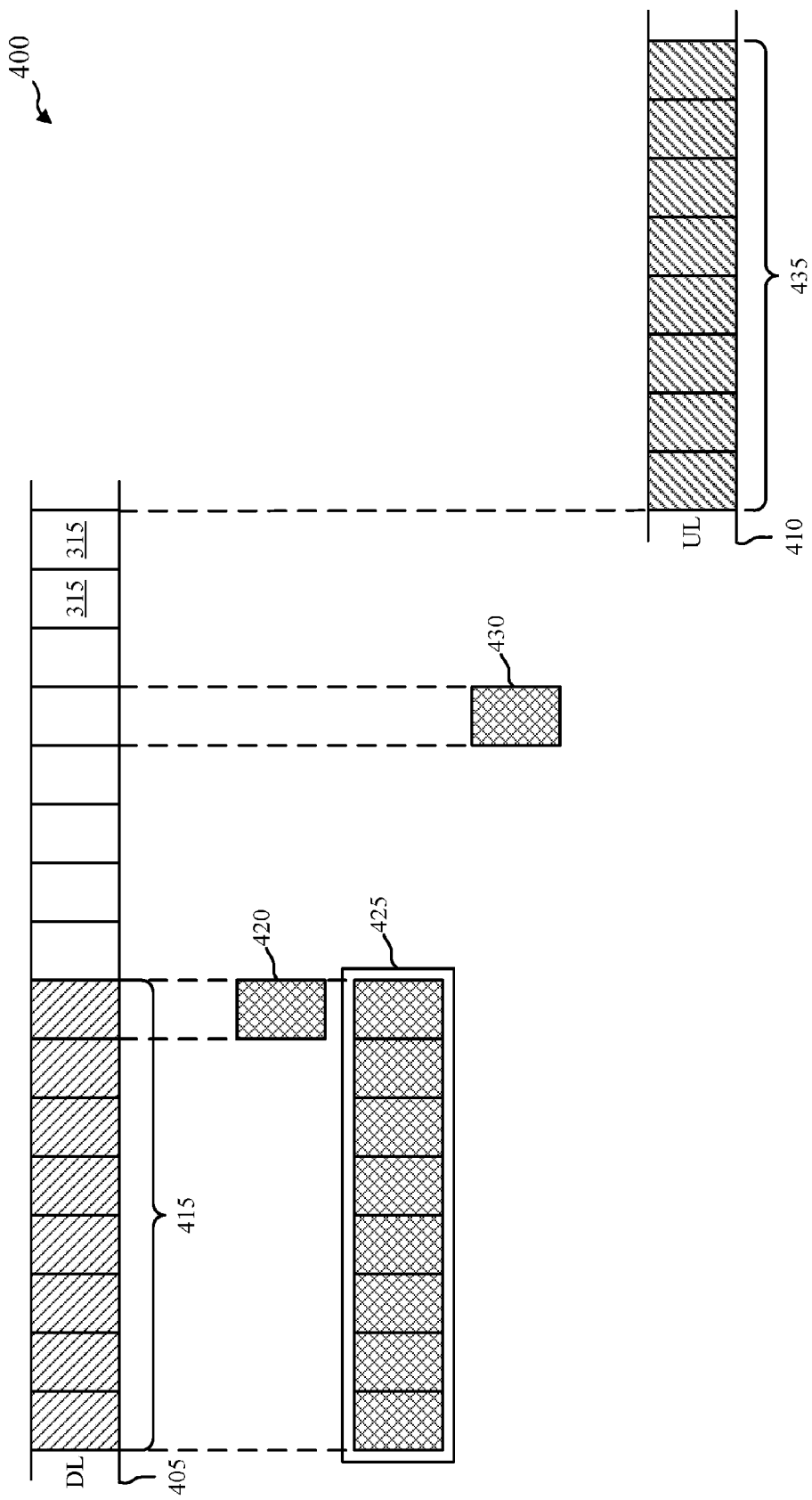
FIG. 4 shows a timeline for CSI reporting using different CSI reference subframes, in accordance with various aspects of the present disclosure.

A-CSI reporting is illustrated in FIG. 4. FIG. 4 illustrates a timeline 400 for CSI reporting using different CSI reference subframes, in accordance with various aspects of the present disclosure. Timeline 400 includes a downlink timeline 405 and an uplink timeline 410. The downlink timeline 405 illustrates relative timing of transmissions from a base station, such as base stations 105 of FIG. 1 or 2, while the uplink timeline 410 illustrates relative timing of transmissions from a UE, such as UEs 115 of FIG. 1 or 2. The downlink timeline 405 and the uplink timeline 410 are divided into subframes 315.

The downlink timeline 405 includes an uplink grant 415 that includes a TTI bundle that spans multiple subframes 315. In the example of FIG. 4, the uplink grant 415 spans eight subframes 315. The uplink grant 415 may act to schedule a PUSCH transmission 435, illustrated on the uplink timeline 410. The scheduled PUSCH transmission 435 is illustrated as being scheduled for eight subframes 315 and may include A-CSI reporting. In the example of FIG. 4, there is a gap of eight subframes 315 between the uplink grant 415 and the PUSCH transmission 435. In practice, the lengths of the uplink grant 415, the PUSCH transmission 435, or the gap between the uplink grant 415 and the PUSCH transmission 435 may all vary.

The A-CSI reporting included in the PUSCH transmission 435 may be based on CSI measurements performed with respect to one or more CSI reference subframes. In FIG. 4, three different alternatives are illustrated for candidate CSI reference subframes. In a first alternative 420, a last valid subframe 315 of the TTI bundle for the uplink grant 415 may be used as the CSI reference subframe. While the subframe 315 identified by the first alternative 420 does represent one subframe used by the uplink grant 415, the first alternative 420 will not result in selection of a CSI reference subframe that represents all of the subframes 315 used by the uplink grant 415. Although not shown, a single reference subframe for CSI measurement may be specified in a different subframe. As an example, a first valid subframe of the TTI bundle for the uplink grant 415 may be used as the CSI reference subframe.

A second alternative 425 may address this concern. In the second alternative 425, two or more subframes 315 within the entire set of subframes of the TTI bundle carrying the uplink grant 415 may be used as CSI reference subframes. The two or more subframes 315 used in the second alternative 425 may be required to be valid for use for CSI measurement. In certain circumstances, all valid subframes 315 in the set of subframes 315 of the TTI bundle carrying the uplink grant 415 may be used for CSI measurement.

When two or more subframes 315 are used for CSI measurement, the CSI measurements may be averaged in order to provide a single CSI data for inclusion in the PUSCH transmission 435. Alternatively, individual reports corresponding to individual CSI reference subframes may also be transmitted with the PUSCH transmission 435.

A third alternative 430 may include using the technique illustrated in FIG. 3B. In the third alternative 430, the latest valid subframe or subframes that is 4 ms or earlier than the PUSCH transmission 435 may be used as a CSI reference subframe. Thus, in timeline 400, the subframe 315 illustrated in the third alternative 430 is four subframes prior to the start of the PUSCH transmission 435. In this third alternative 430, the gap between the identified valid CSI reference subframe and the PUSCH transmission 435 may include at least one subframe that is not carrying the uplink grant 415. In the third alternative 430, the identified CSI reference subframe may or may not correspond to a subframe 315 on which the uplink grant 415 was transmitted.

While the CSI reference subframes identified through the first alternative 420 and the third alternative 430 may require a least amount of processing at a UE 115, the potentially most accurate CSI measurement may result from use of the second alternative 425.

In certain circumstances, a PDSCH transmission may be repeated in a first sub-band while an uplink grant may be repeated or bundled in a second sub-band that is different from the first sub-band. In this case, the uplink grant may still be on a single sub-band, and any of the first alternative 420, second alternative 425, or third alternative 430 illustrated in FIG. 4 may be applied for A-CSI reporting. However, in this situation, the sub-band used for CSI measurement (corresponding to the sub-band on which the uplink grant is transmitted) may not be aligned with the sub-band for which the next PDSCH may be transmitted. However, this situation may be under the control of a base station 105, which may select different sub-bands for transmission of uplink grants in order to obtain CSI feedback for the different sub-bands. Additionally or separately, a base station 105 may choose to use P-CSI to obtain CSI measurements of different sub-bands to determine a preferred sub-band for PDSCH transmissions.

In another aspect of the disclosure, CSI reference subframe selection is considered when an uplink grant is transmitted across multiple subframes and across multiple sub-bands (i.e., in a situation with sub-band hopping). This situation is illustrated in FIG. 5.

Figure 5:
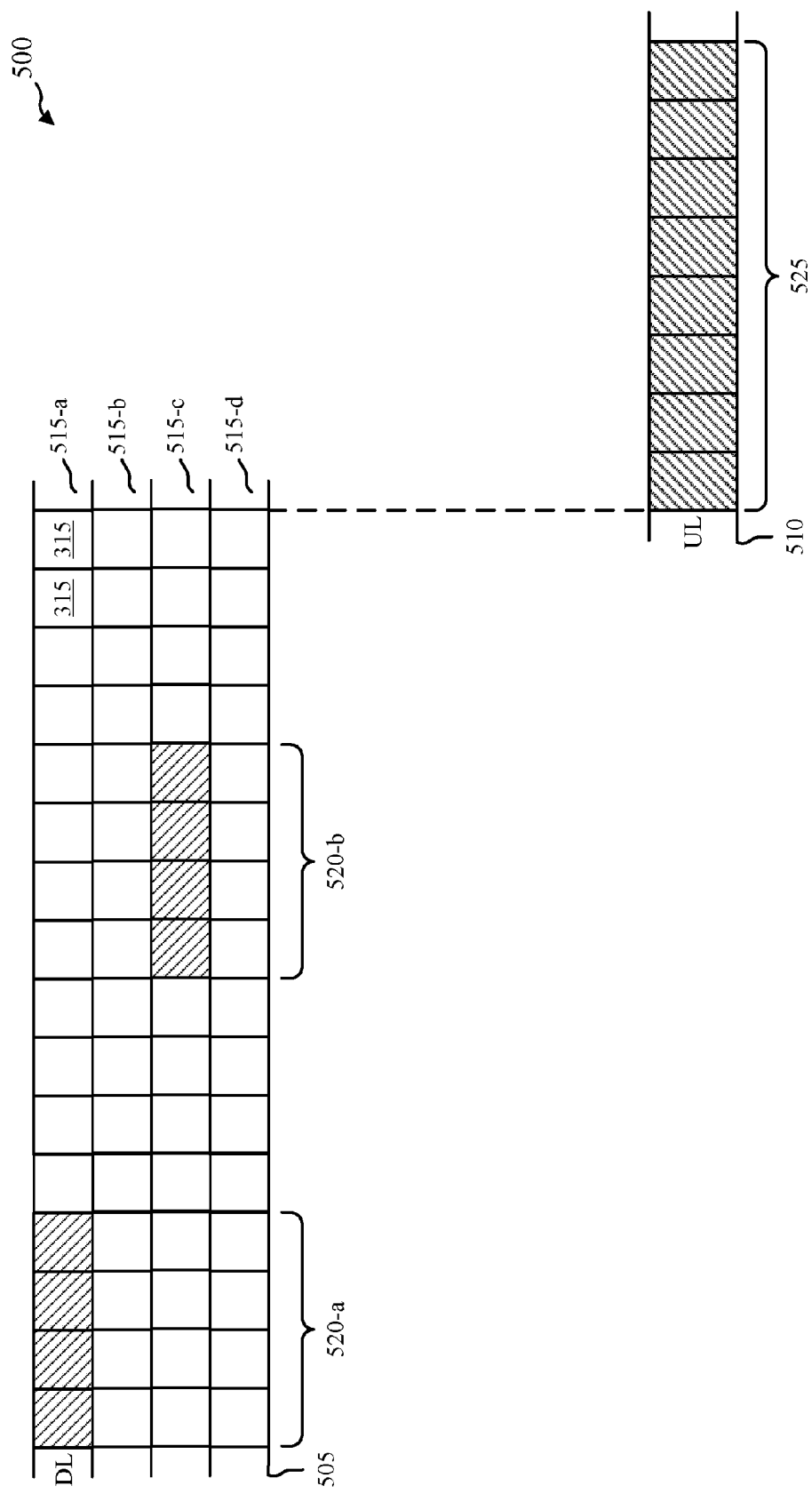
FIG. 5 shows an example timeline for receiving an uplink grant across a plurality of subframes and sub-bands, in accordance with various aspects of the present disclosure.

FIG. 5 shows an example timeline 500 for receiving an uplink grant across a plurality of subframes and sub-bands, in accordance with various aspects of the present disclosure. Timeline 500 includes a downlink timeline 505 and an uplink timeline 510. The downlink timeline 505 illustrates relative timing of transmissions from a base station, such as base stations 105 of FIG. 1 or 2, while the uplink timeline 510 illustrates relative timing of transmissions from a UE, such as UEs 115 of FIG. 1 or 2. The downlink timeline 505 and the uplink timeline 510 are divided into subframes 315. The downlink timeline 505 is also divided across multiple sub-bands 515. In the example of FIG. 5, the downlink timeline 505 includes sub-band 515-a, sub-band 515-b, sub-band 515-c, and sub-band 515-d. Any number of sub-bands 515 may be included in the downlink timeline 505.

An uplink grant transmitted on the downlink timeline 505 may include a TTI bundle that is divided into two or more TTI sub-bundles 520. In the example of FIG. 5, a first TTI sub-bundle 520-a is illustrated as occupying four subframes 315 on sub-band 515-a. A second TTI sub-bundle 520-b is illustrated as occupying four subframes 315 on sub-band 515-c. Thus, in this example, the uplink grant uses eight subframes 315 across two TTI sub-bundles 520, each with four subframes 315. The uplink grant may act to schedule a PUSCH transmission 525, illustrated on the uplink timeline 510. The scheduled PUSCH transmission 525 is illustrated as being scheduled for eight subframes 315 and may include A-CSI reporting. In the example of FIG. 5, there is a gap of four subframes 315 between the second TTI sub-bundle 520-b and the PUSCH transmission 525. In practice, the lengths and numbers of the TTI sub-bundles 520, the sub-bands 515 occupied by the TTI sub-bundles 520, the length of the PUSCH transmission 525, and the gap between the second (or last) TTI sub-bundle 520-b and the PUSCH transmission 525 may all vary.

The splitting of the uplink grant across multiple sub-bands 515 may assist in improving frequency diversity for the transmissions, especially for MTC UEs, for example. In doing so, a base station may also be able to benefit from frequency or sub-band selective scheduling, though a base station is not required to do so. Therefore, if a base station intends to exploit frequency-selective scheduling, the base station will benefit from receipt of CSI reporting reflecting CSI measurements made on specific sub-bands 515. In this situation, CSI reference subframes may be identified in the same manner explained in relation to FIG. 4 for A-CSI reporting and in relation to FIG. 3A for P-CSI reporting, except that the subframes to be used as CSI reference subframes may be located on sub-bands specified by a base station (as the base station is intending to exploit frequency-selective scheduling based on the CSI measurements of different sub-bands.

However, when a base station has no intention to exploit frequency-selective scheduling, the CSI measurements may be performed and averaged over multiple sub-bands, for example. Additional examples and alternatives are explained below.

Even when sub-band hopping is present, P-CSI reporting may function as outlined above with respect to FIG. 3A. That is, a P-CSI reporting subframe may be selected in accordance with a P-CSI configuration (defining, for example, the periodicity and offset of the P-CSI reporting subframe, and also including a sub-band to be evaluated). A CSI reference subframe on the identified sub-band may then be selected a pre-defined number of subframes n before the P-CSI reporting subframe. In an example, n may be four or more subframes. The selected CSI reference subframe must also be valid for CSI measurements. Therefore, if the subframe that is n subframes before the P-CSI reporting subframe is not valid for CSI measurement, then the n+1 subframe (the subframe that is n+1 subframes before the P-CSI reporting subframe) may be considered and used if it is valid. The sub-band for which the CSI is reported is, in this case, the same as the measured sub-band. Alternatively, multiple CSI reference subframes spanning multiple sub-bands may be specified such that the P-CSI reporting reflects an averaged channel quality over multiple sub-bands.

Figure 6:
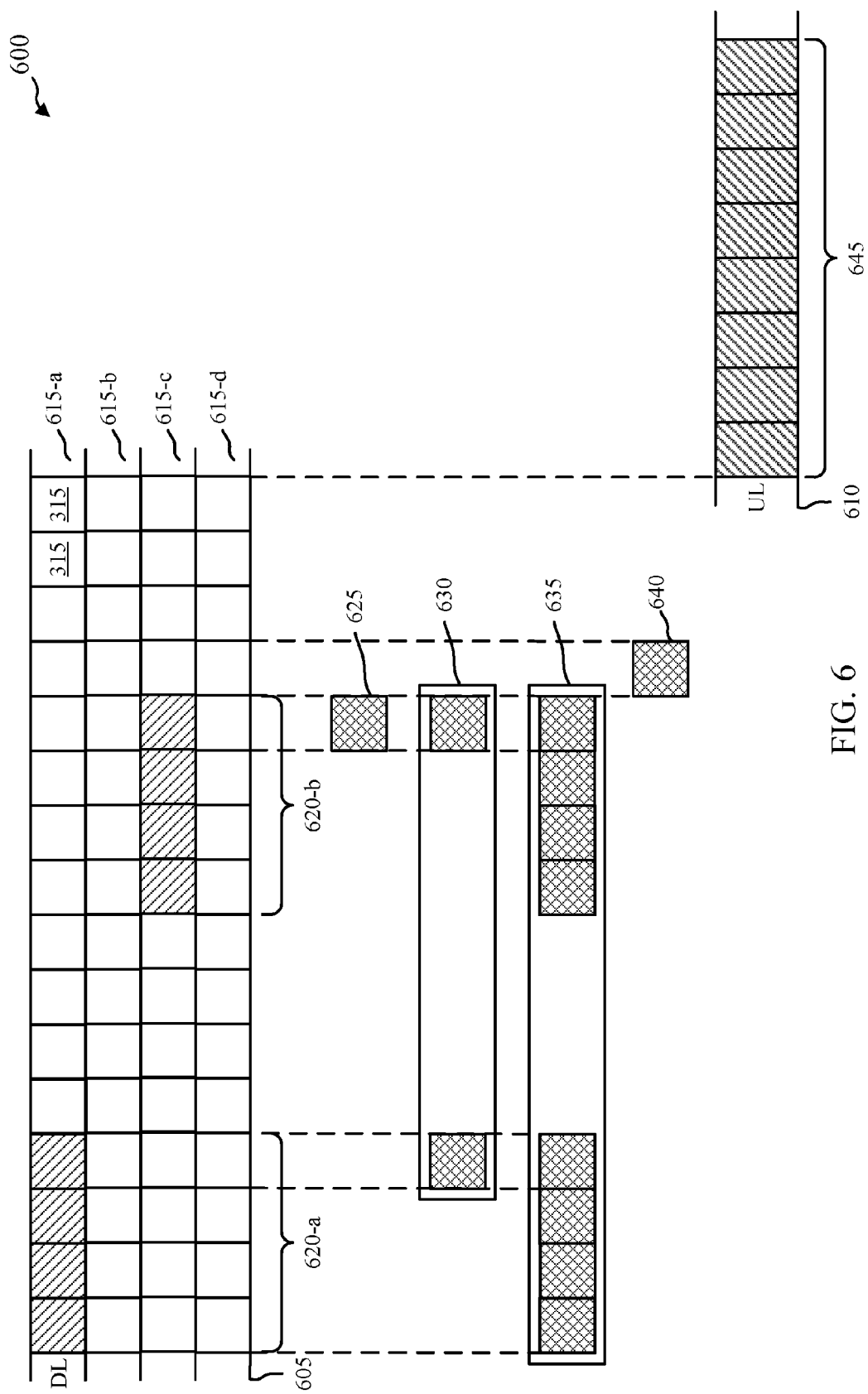
FIG. 6 shows a timeline for CSI reporting using different CSI reference subframes and sub-bands, in accordance with various aspects of the present disclosure.

A-CSI reporting for the situation where sub-band hopping occurs is illustrated in FIG. 6. FIG. 6 illustrates a timeline 600 for CSI reporting using different CSI reference subframes, in accordance with various aspects of the present disclosure. Timeline 600 includes a downlink timeline 605 and an uplink timeline 610. The downlink timeline 605 illustrates relative timing of transmissions from a base station, such as base stations 105 of FIG. 1 or 2, while the uplink timeline 610 illustrates relative timing of transmissions from a UE, such as UEs 115 of FIG. 1 or 2. The downlink timeline 605 and the uplink timeline 610 are divided into subframes 315. The downlink timeline 605 is also divided across multiple sub-bands 615. In the example of FIG. 6, the downlink timeline 605 includes sub-band 615-*a*, sub-band 615-*b*, sub-band 615-*c*, and sub-band 615-*d*. Any number of sub-bands 615 may be included in the downlink timeline 605.

An uplink grant transmitted on the downlink timeline 605 may include a TTI bundle that is divided into two or more TTI sub-bundles 620. In the example of FIG. 6, a first TTI sub-bundle 620-*a* is illustrated as occupying four subframes 315 on sub-band 615-*a*. A second TTI sub-bundle 620-*b* is illustrated as occupying four subframes 315 on sub-band 615-*c*. Thus, in this example, the uplink grant uses eight subframes 315 across two TTI sub-bundles 620, each with four subframes 315. The uplink grant may act to schedule a PUSCH transmission 645, illustrated on the uplink timeline 610. The scheduled PUSCH transmission 645 is illustrated as being scheduled for eight subframes 315 and may include A-CSI reporting. In the example of FIG. 6, there is a gap of four subframes 315 between the second TTI sub-bundle 620-*b* and the PUSCH transmission 645. In practice, the lengths and numbers of the TTI sub-bundles 620, the sub-bands 615 occupied by the TTI sub-bundles 620, the length of the PUSCH transmission 645, and the gap between the second (or last) TTI sub-bundle 620-*b* and the PUSCH transmission 645 may all vary.

The A-CSI reporting included in the PUSCH transmission 645 may be based on CSI measurements performed with respect to one or more CSI reference subframes. In FIG. 6, four different alternatives are illustrated for candidate CSI reference subframes. In a first alternative 625, a last valid subframe 315 of the second (or last) TTI sub-bundle 620-*b* may be used as the CSI reference subframe. If the identified CSI reference subframe is not valid for CSI measurements, the next earlier subframe on the sub-band may be selected until a valid subframe is identified. While the subframe 315 identified by the first alternative 625 does represent one subframe used by the uplink grant, the first alternative 625 will not result in selection of a CSI reference subframe that represents all of the subframes 315 used by the uplink grant. Additionally, the first alternative 625 results in the use of a CSI reference subframe that only represents one sub-band on which the uplink grant is transmitted. Although not shown, two or more valid subframes may be used in the second (or last) TTI sub-bundle 620-*b* for CSI measurement. Although not shown, a single reference subframe for CSI measurement may be specified in a different subframe or in a different sub-bundle. As an example, a first valid subframe of the second (or last) TTI sub-bundle 620-*b* for the uplink grant may be used as the CSI reference subframe. As another example, a first valid subframe of the first TTI sub-bundle 620-*a* for the uplink grant may be used as the CSI reference subframe.

A second alternative 630 improves upon the first alternative 625. In the second alternative 630, a last valid subframe 315 of each of the first TTI sub-bundle 620-*a* and the second TTI sub-bundle 620-*b* may be used as the CSI reference subframes. When two or more subframes 315 are used for CSI measurement, the CSI measurements may be averaged in order to provide a single CSI data for inclusion in the PUSCH transmission 645. Alternatively, individual reports corresponding to individual CSI reference subframes and sub-bands may also be transmitted with the PUSCH transmission 645. As with each of the alternatives described herein, the identified subframes should also be valid for CSI measurements. If one of the identified CSI reference subframes is not valid for CSI measurements, the next earlier subframe on the sub-band may be selected until a valid subframe is identified.

In a third alternative 635, two or more subframes 315 within the entire set of subframes of the TTI bundle carrying the uplink grant, including both the first TTI sub-bundle 620-*a* and the second TTI sub-bundle 620-*b* of FIG. 6, may be used as CSI reference subframes. The two or more subframes 315 used in the third alternative 635 may be required to be valid for use for CSI measurement. In certain circumstances, all valid subframes 315 in the set of subframes 315 of the combined TTI sub-bundles 620 carrying the uplink grant may be used for CSI measurement. As described above, when two or more subframes 315 are used for CSI measurement, the CSI measurements may be averaged in order to provide a single CSI data for inclusion in the PUSCH transmission 645. Alternatively, individual reports corresponding to individual CSI reference subframes may also be transmitted with the PUSCH transmission 645.

A fourth alternative 640 may include using the technique illustrated in FIG. 3B. In the fourth alternative 640, the latest valid subframe that is 4 ms or earlier than the PUSCH transmission 645 may be used as a CSI reference subframe. The sub-band for which the CSI is reported is, in this case, the same as the measured sub-band. Thus, in timeline 600, the subframe 315 illustrated in the fourth alternative 640 is four subframes prior to the start of the PUSCH transmission 645. In this fourth alternative 640, the gap between the identified valid CSI reference subframe and the PUSCH transmission 645 may include at least one subframe that is not carrying the uplink grant.

While the CSI reference subframes identified through the first alternative 625 and the fourth alternative 640 may require a least amount of processing at a UE 115, the potentially more accurate CSI measurements may result from use of the second alternative 630 or the third alternative 635.

The alternatives identified in relation to FIGS. 3A, 3B, 4, and 6 may be used in identifying valid CSI reference subframes for either P-CSI or A-CSI reporting. In particular, when CSI reporting is based on a CRS, the alternatives identified above may be sufficient to handle the situations where an uplink transmission is transmitted across multiple subframes and/or sub-bands. When CSI reporting is based on a CSI-RS, however, additional considerations may be warranted. These may include ensuring that a non-zero power (NZP) CSI-RS be bundled as well for channel measurement. The bundled NZP CSI-RS may be bundled along with an intended PDSCH operation. Additionally, IMR may be enabled in multiple subframes in order to support interference measurement across the multiple subframes.

The alternatives identified above may be specified in a CSI configuration. For example, an A-CSI configuration may identify one or more of the alternatives described with relation to FIG. 3B, 4 or 6 for identifying a CSI reference subframe and for determining CSI data. The A-CSI configuration may be located at a UE 115. In an embodiment, the A-CSI configuration may be received by the UE 115 from a base station 105.

A P-CSI configuration may identify a periodicity, offset, etc. for the CSI measurements. In one embodiment, a P-CSI configuration may be dependent on a bundling size of an uplink transmission used by the UE 115. For example, if no uplink bundling is being used, a UE 115 may use a default or existing P-CSI configuration having a defined periodicity and/or offset. However, if uplink bundling is being used, the UE 115 may use an indexed P-CSI configuration, for example. Thus, for a given bundling size, a P-CSI configuration may be defined. A first uplink bundling size may trigger use of a first defined P-CSI configuration, while a second uplink bundling size may trigger use of a second defined P-CSI configuration. As a specific example, a bundling size of eight for uplink transmissions may trigger a P-CSI configuration that specifies that P-CSI is transmitted every eight bundles, and the offset may be defined in terms of the granularity of the bundling.

Alternatively, P-CSI configurations may be used without respect to bundling size of uplink transmissions.

Additionally or separately, a minimum gap between a last valid subframe for CSI measurement and a corresponding CSI report (P-CSI, A-CSI, or both) may be larger than 4 ms. As an example, the minimum gap can be specified as 6 ms. Compared with 4 ms, a larger minimum gap provides a longer time for an MTC UE to process the measurement signal for CSI reporting, and hence reduces the processing need at the MTC UE. Additionally, the minimum gap may be a function of a bundling length. As an example, if a TTI bundling length is 1, a minimum gap of 6 ms may be specified. If a TTI bundling length is 8, a minimum gap of 10 ms may be specified.

Figure 7:
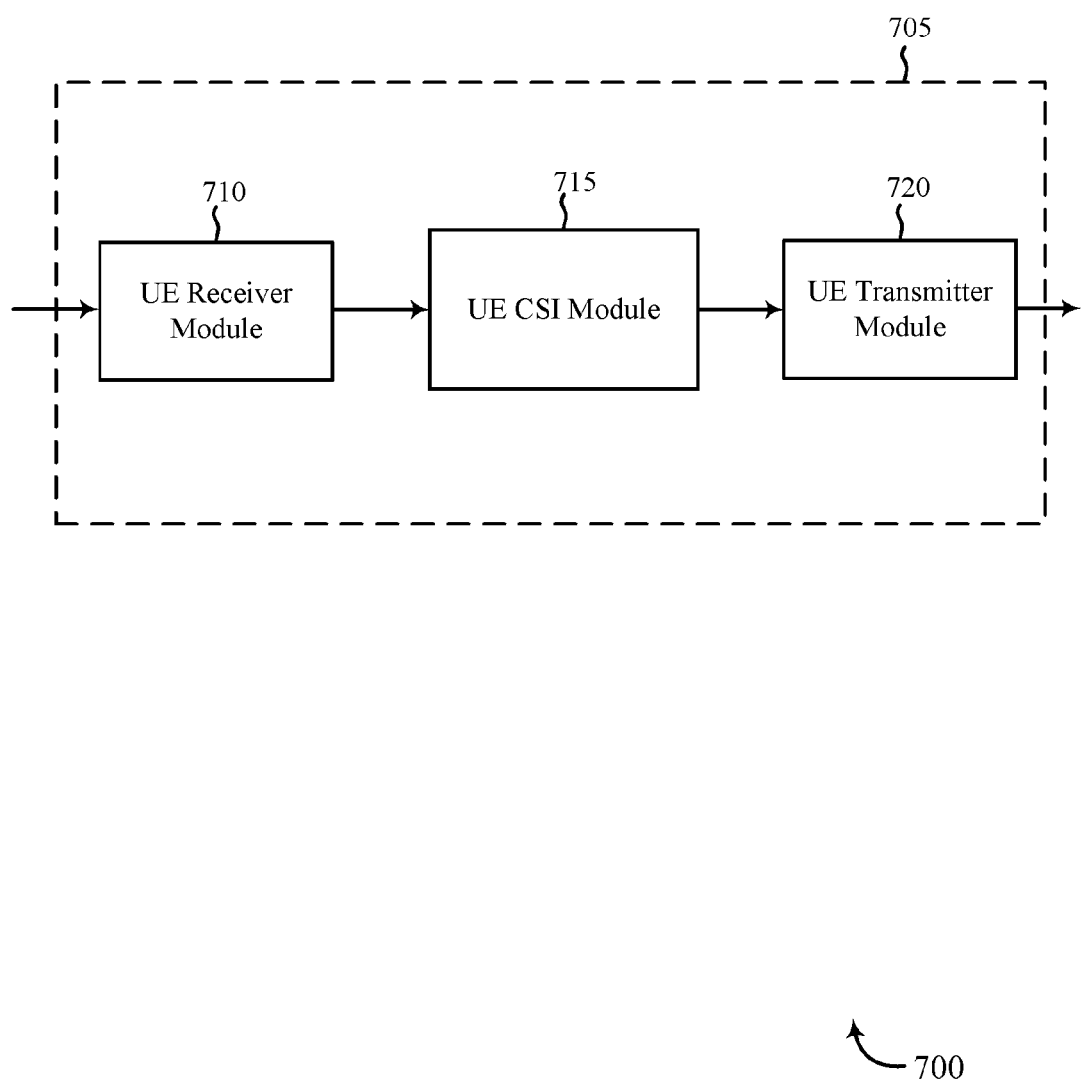
FIG. 7 shows a block diagram of a device configured for use in wireless communication, in accordance with various aspects of the present disclosure.

FIG. 7 shows a block diagram 700 of a device 705 for use in wireless communication, in accordance with various aspects of the present disclosure. The device 705 may be an example of one or more aspects of a UE 115 described with reference to FIG. 1 or 2 having the functionalities described with respect to FIG. 3A, 3B, or 4-6. The device 705 may include a UE receiver module 710, a UE CSI module 715, and/or a UE transmitter module 720. The device 705 may also be or include a processor (not shown). Each of these modules may be in communication with each other.

The components of the device 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The UE receiver module 710 may receive information such as packets, user data, and/or control information associated with various information channels (e.g., control channels, data channels, etc.). The UE receiver module 710 may be configured to receive bundled uplink grants, for example, in a coverage enhancement environment. The bundled uplink grants may include TTI bundles that are transmitted over multiple subframes and/or multiple sub-bands. PDSCH transmission may also be received using the UE receiver module 710. Additionally, in certain aspects, P-CSI or A-CSI configurations may be received via the UE receiver module 710. Received information may be passed on to the UE CSI module 715, and to other components of the device 705.

The UE CSI module 715 may be used by the device 705 to measure and report CSI data to a base station. In particular, the UE CSI module 715 may be used in circumstances when the device 705 receives an uplink grant across multiple subframes and/or sub-bands and is required to determine CSI data. The UE CSI module 715 may be used to recognize a configuration of the received TTI bundles of the uplink grant and determine whether the received TTI bundles are spread across multiple subframes or sub-bands. Based on a determined configuration, the UE CSI module 715 may be used to identify one or more subframes to use as CSI reference subframes. The UE CSI module 715 may also be used to perform CSI measurements using the one or more identified CSI reference subframes. The resulting CSI data may be passed to the UE transmitter module 720 for transmission to a base station.

The UE transmitter module 720 may transmit the one or more signals received from other components of the device 705. The UE transmitter module 720 may transmit CSI data to a base station, in conjunction with the operations of the UE CSI module 715. In some examples, the UE transmitter module 720 may be collocated with the UE receiver module 710 in a transceiver module.

Figure 8:
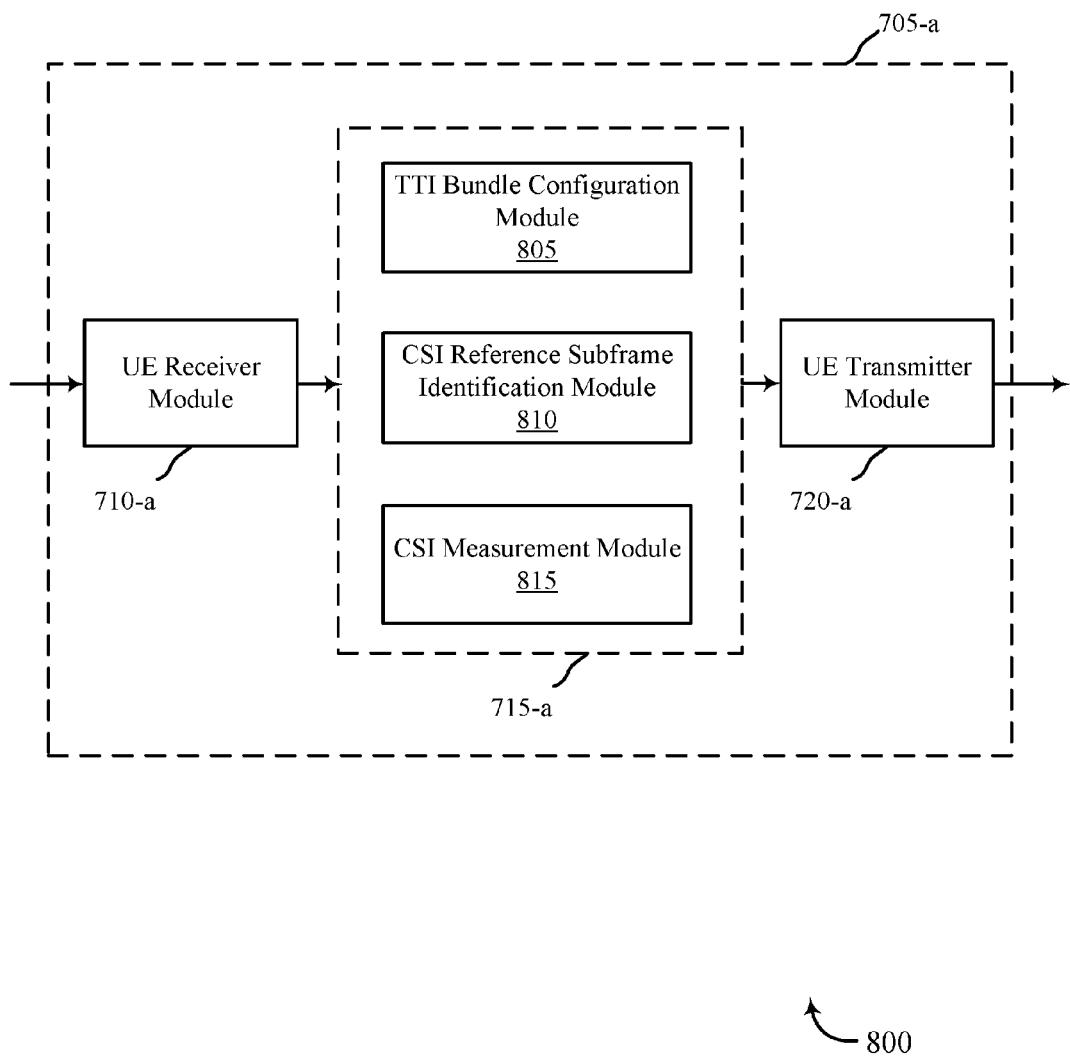
FIG. 8 shows a block diagram of a device configured for use in wireless communication, in accordance with various aspects of the present disclosure.

FIG. 8 shows a block diagram 800 of a device 705-a for use in wireless communication, in accordance with various examples. The device 705-a may be an example of one or more aspects of a UE 115 described with reference to FIG. 1 or 2, carrying out the functions described with relation to FIG. 3A, 3B, or 4-6. It may also be an example of a device 705 described with reference to FIG. 7. The device 705-a may include a UE receiver module 710-a, a UE CSI module 715-a, and/or a UE transmitter module 720-a, which may be examples of the corresponding modules of device 705. The device 705-a may also include a processor (not shown). Each of these components may be in communication with each other. The UE CSI module 715-a may include a TTI bundle configuration module 805, a CSI reference subframe identification module 810, or a CSI measurement module 815. The UE receiver module 710-a and the UE transmitter module 720-a may perform the functions of the UE receiver module 710 and the UE transmitter module 720, of FIG. 7, respectively.

The TTI bundle configuration module 805 may be used by the device 705-a to determine a configuration of one or more TTI bundles included in an uplink grant transmission received by the device 705-a. For example, in a coverage enhancement situation, the device 705-a may receive an uplink grant across multiple subframes and/or sub-bands. An uplink grant that is transmitted across multiple subframes may include a TTI bundle that spans the multiple subframes. An uplink grant that is transmitted across multiple sub-frames and sub-bands may include one or more TTI sub-bundles, each spanning multiple subframes and each carried on different sub-bands. The TTI bundle configuration module 805 may be used by the device 705-a to determine the specific TTI bundle configuration received with an uplink grant.

The CSI reference subframe identification module 810 may be used by the device 705-a to identify one or more CSI reference subframes in view of the TTI bundle configuration identified by the TTI bundle configuration module 805. Thus, and for example, the CSI reference subframe identification module 810 may include a CSI configuration that defines which of the alternatives discussed above with respect to FIG. 3A, 3B, 4, or 6 to use in determining a CSI reference subframe. The CSI reference subframe identification module 810 may include multiple CSI configurations that may be selected from based on the TTI bundle configuration and whether P-CSI reporting or A-CSI reporting is being used. In one example, the CSI reference subframe identification module 810 may elect to use a last valid subframe of a TTI bundle or a TTI sub-bundle as a CSI reference subframe. In another example, the CSI reference subframe identification module 810 may elect to use a last valid subframe of each of multiple TTI sub-bundles as CSI reference subframes. Multiple subframes, including all valid subframes in a TTI bundle or across multiple TTI sub-bundles may be used as CSI reference subframes. Additionally, subframes that occur a set number of subframes before CSI reporting may also be identified as CSI reference subframes. In fine, the identification of CSI reference subframes by the CSI reference subframe identification module may be dependent upon a TTI configuration identified by the TTI bundle configuration module and may also be dependent upon a CSI configuration.

The CSI measurement module 815 may be used by the device 705-*a* to measure CSI over the subframe or subframes identified as CSI reference subframes by the CSI reference subframe identification module 810. CSI measurements may also be performed in accordance with a CSI configuration. Thus, if the CSI configuration defined that CSI measurements should be made for multiple CSI reference subframes and then averaged together, the CSI measurement module 815 would be used to perform the CSI measurements and to average the measurements together. Therefore, the CSI measurement module 815 may perform CSI measurements, averaging of the CSI measurements (where defined by a CSI configuration), and may facilitate the transmission of one or more CSI data (using, for example, the UE transmitter module 720-*a*).

Figure 9:
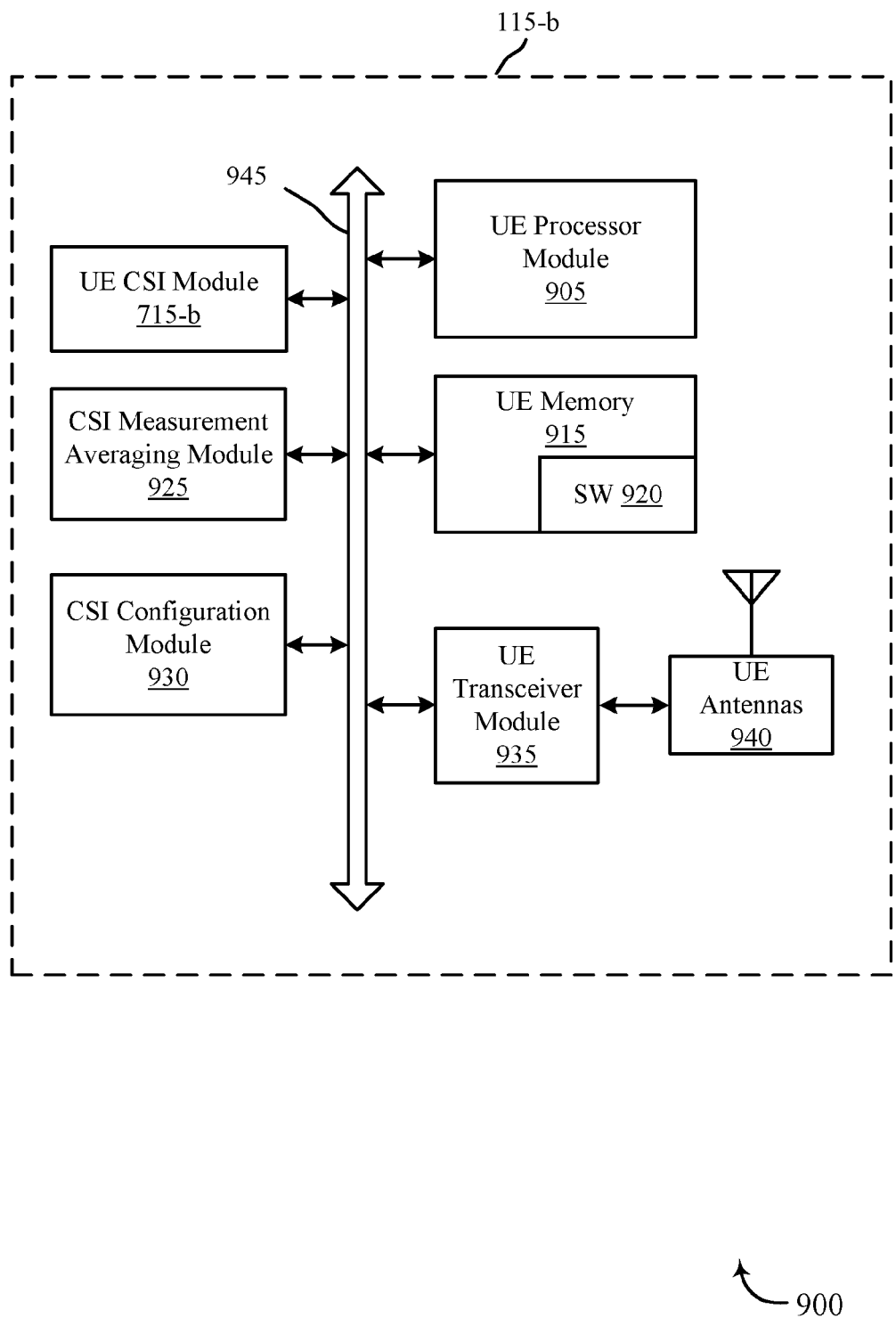
FIG. 9 shows a block diagram of a wireless communication system, in accordance with various aspects of the present disclosure.

FIG. 9 shows a system 900 for use in wireless communication, in accordance with various examples. System 900 may include a UE 115-*b*, which may be an example of the UEs 115 of FIG. 1 or 2, incorporating the functions described with respect to FIG. 3A, 3B, or 4-6. UE 115-*b* may also be an example of one or more aspects of devices 705 of FIGS. 7 and 8.

The UE 115-*b* may generally include components for bi-directional voice and data communications including components for transmitting communications and components for receiving communications. The UE 115-*b* may include UE antenna(s) 940, a UE transceiver module 935, a UE processor module 905, and UE memory 915 (including software (SW) 920), which each may communicate, directly or indirectly, with each other (e.g., via one or more buses 945). The UE transceiver module 935 may be configured to communicate bi-directionally, via the UE antenna(s) 940 and/or one or more wired or wireless links, with one or more networks, as described above. For example, the UE transceiver module 935 may be configured to communicate bi-directionally with base stations 105 with reference to FIGS. 1-6. The UE transceiver module 935 may include a modem configured to modulate the packets and provide the modulated packets to the UE antenna(s) 940 for transmission, and to demodulate packets received from the UE antenna(s) 940. While the UE 115-*b* may include a single UE antenna 940, the UE 115-*b* may have multiple UE antennas 940 capable of concurrently transmitting and/or receiving multiple wireless transmissions. The UE transceiver module 935 may be capable of concurrently communicating with one or more base stations 105 via multiple component carriers.

The UE 115-*b* may include a UE CSI module 715-*b*, which may perform the functions described above for the UE CSI modules 715 of device 705 of FIGS. 7 and 8. The UE 115-*b* may also include a CSI measurement averaging module 925 or a CSI configuration module 930. The CSI measurement averaging module 925 may be a module separate from or incorporated with the CSI measurement module 815 (of FIG. 8) and may be used to average already obtained CSI measurements prior to transmitting the CSI data to a base station. The CSI configuration module 930 may be used to store a CSI configuration that may then be used by either the CSI reference subframe identification module 810 or the CSI measurement module 815 (of FIG. 8) to define a CSI configuration. The stored CSI configuration may dictate a scheme for determining CSI reference subframes (as used by the CSI reference subframe identification module 810). The stored CSI configuration may also dictate whether one or multiple CSI measurements should be made and whether measurements should be averaged (as used by the CSI measurement module 815). The stored CSI configurations may include stored A-CSI configurations and stored P-CSI configurations. In the case of stored P-CSI configurations, multiple configurations may be stored corresponding to different sizes of bundling that may be used on uplink transmissions.

The UE memory 915 may include random access memory (RAM) and read-only memory (ROM). The UE memory 915 may store computer-readable, computer-executable software/firmware code 920 containing instructions that are configured to, when executed, cause the UE processor module 905 to perform various functions described herein (e.g., performing CSI measurements on identified CSI reference subframes when the UE 115-*b* is in receipt of bundled uplink grants). Alternatively, the computer-readable, computer-executable software/firmware code 920 may not be directly executable by the UE processor module 905 but be configured to cause a computer (e.g., when compiled and executed) to perform functions described herein. The UE processor module 905 may include an intelligent hardware device, e.g., a central processing unit (CPU), a microcontroller, an ASIC, etc.

Figure 10:
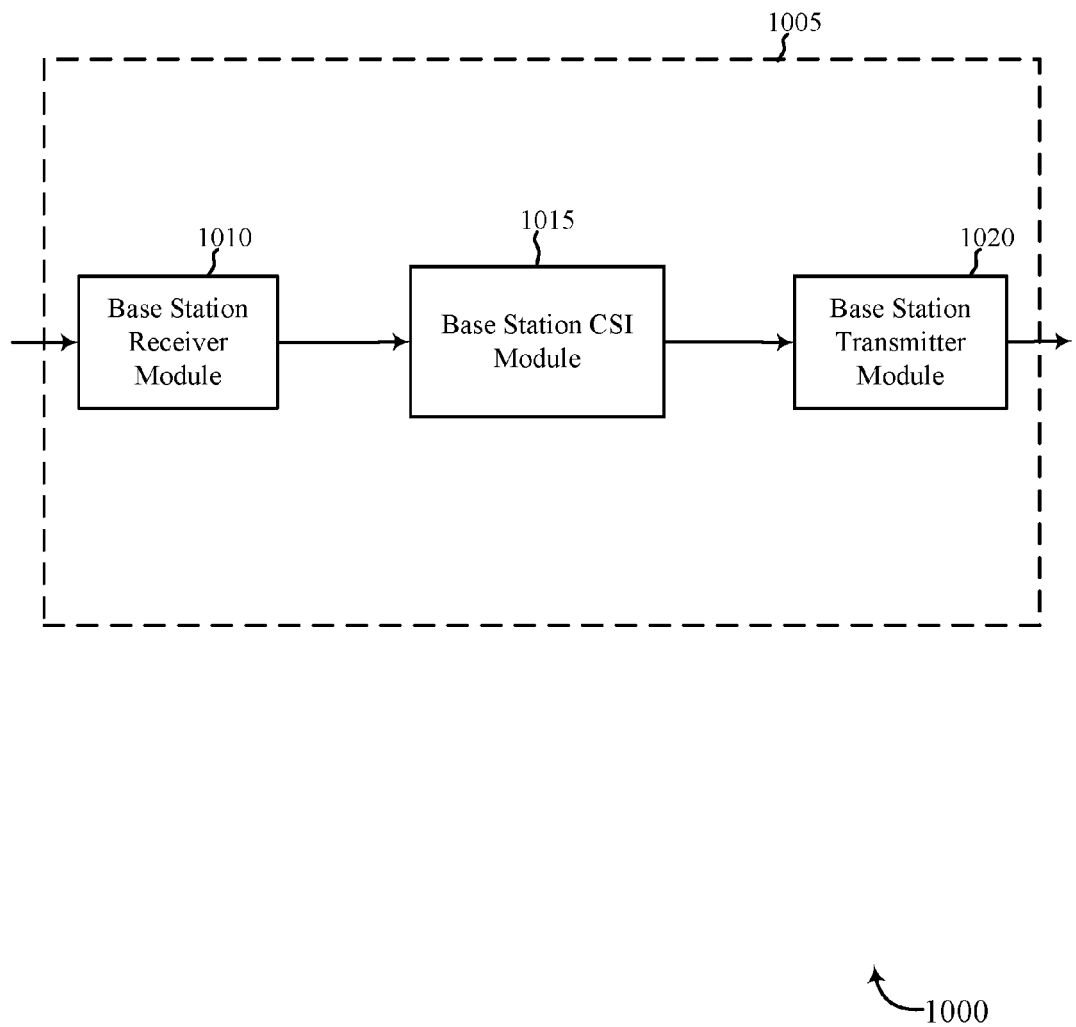
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105 described with reference to FIG. 1 or 2 and having the functionality described with respect to FIGS. 3-6. In some examples, the apparatus 1005 may be part or include an LTE/LTE-A eNB and/or an LTE/LTE-A base station. The apparatus 1005 may also be a processor. The apparatus 1005 may include a base station receiver module 1010, a base station CSI module 1015, and/or a base station transmitter module 1020. Each of these modules may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the base station receiver module 1010 may include at least one radio frequency (RF) receiver, such as an RF receiver operable to receive CSI data transmitted by a UE. The base station receiver component 1010 may be used to receive various types of data and/or control signals (i.e., transmissions) over one or more communication links of a wireless communication system, such as one or more communication links of the wireless communication system 100 described with reference to FIGS. 1-6.

In some examples, the base station transmitter module 1020 may include at least one RF transmitter, such as at least one RF transmitter operable to transmit an uplink grant across multiple subframes or sub-bands. The base station transmitter module 1020 may also be operable to transmit a CSI configuration to a UE, thus allowing the UE to use one or more CSI configurations in determining CSI data. The base station transmitter module 1020 may be used to transmit various types of data and/or control signals (i.e., transmissions) over one or more communication links of a wireless communication system, such as one or more communication links of the wireless communication system 100 described with reference to FIGS. 1-6.

In some examples, the base station CSI module 1015 may be configured to generate one or more CSI configurations to be used by a UE. The CSI configurations may include different P-CSI configurations defining periodicity and offset, for example, as a function of bundling size. The CSI configurations may include different A-CSI configurations, identifying different options for identifying CSI reference subframes and different options for measuring CSI data. The CSI configurations may correspond to an index of configurations that is known by or transmitted to a UE.

Figure 11:
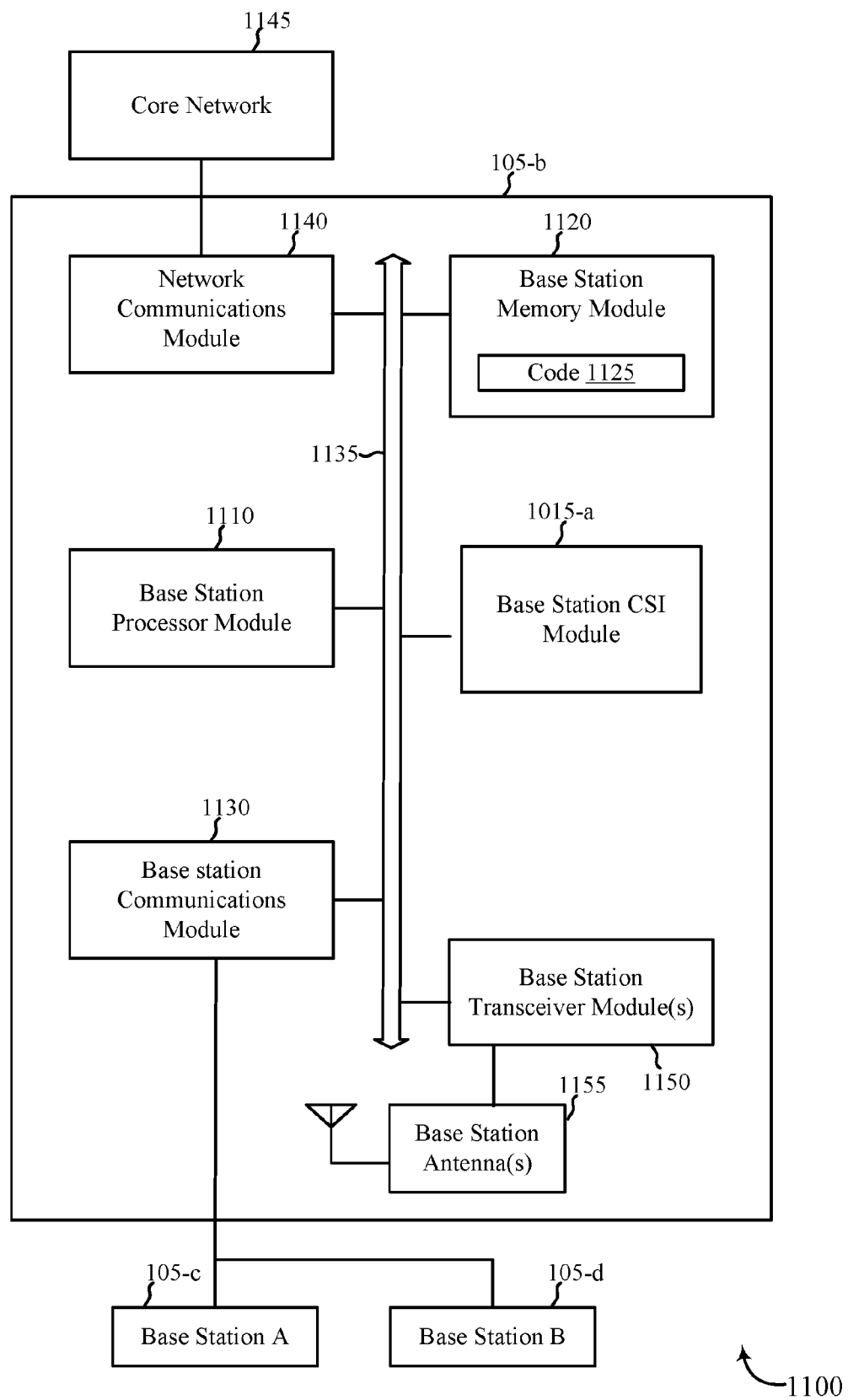
FIG. 11 shows a block diagram of a base station for use in wireless communication, in accordance with various aspects of the present disclosure.

FIG. 11 shows a block diagram 1100 of a base station 105-*b* (e.g., a base station forming part or all of an eNB) for use in wireless communication, in accordance with various aspects of the present disclosure. In some examples, the base station 105-*b* may be an example of aspects of one or more of the base stations 105 described with reference to FIG. 1 or 2 having functionality described with reference to FIG. 3A, 3B, or 4-6, and/or aspects of one or more of the apparatus 1005 when configured as a base station, as described with reference to FIG. 10. The base station 105-*b* may be configured to implement or facilitate at least some of the base station and/or apparatus features and functions described with reference to FIGS. 1-6.

The base station 105-*b* may include a base station processor module 1110, a base station memory module 1120, at least one base station transceiver module (represented by base station transceiver module(s) 1150), at least one base station antenna (represented by base station antenna(s) 1155), and/or a base station CSI module 1015-*a*. The base station 105-*b* may also include one or more of a base station communications module 1130 and/or a network communications module 1140. Each of these modules may be in communication with each other, directly or indirectly, over one or more buses 1135.

The base station memory module 1120 may include random access memory (RAM) and/or read-only memory (ROM). The base station memory module 1120 may store computer-readable, computer-executable software/firmware code 1125 containing instructions that are configured to, when executed, cause the base station processor module 1110 to perform various functions described herein related to wireless communication (e.g., generation and/or transmission of CSI configurations, etc.). Alternatively, the computer-readable, computer-executable software/firmware code 1125 may not be directly executable by the base station processor module 1110 but be configured to cause the base station 1105 (e.g., when compiled and executed) to perform various of the functions described herein.

The base station processor module 1110 may include an intelligent hardware device, e.g., a CPU, a microcontroller, an ASIC, etc. The base station processor module 1110 may process information received through the base station transceiver module(s) 1150, the base station communications module 1130, and/or the network communications module 1140. The base station processor module 1110 may also process information to be sent to the transceiver module(s) 1150 for transmission through the antenna(s) 1155, to the base station communications module 1130, for transmission to one or more other base stations 105-*c* and 105-*d*, and/or to the network communications module 1140 for transmission to a core network 1145, which may be an example of one or more aspects of the core network 130 described with reference to FIG. 1. The base station processor module 1110 may handle, alone or in connection with the base station CSI module 1015-*a*, various aspects of CSI configuration generation and transmission.

The base station transceiver module(s) 1150 may include a modem configured to modulate packets and provide the modulated packets to the base station antenna(s) 1155 for transmission, and to demodulate packets received from the base station antenna(s) 1155. The base station transceiver module(s) 1150 may, in some examples, be implemented as one or more base station transmitter modules and one or more separate base station receiver modules. The base station transceiver module(s) 1150 may support communications in a first radio frequency spectrum band and/or a second radio frequency spectrum band. The base station transceiver module(s) 1150 may be configured to communicate bi-directionally, via the antenna(s) 1155, with one or more UEs or apparatuses, such as one or more of the UEs 115 described with reference to FIG. 1, 2, or 9. The base station 105-*b* may, for example, include multiple base station antennas 1155 (e.g., an antenna array). The base station 105-*b* may communicate with the core network 1145 through the network communications module 1140. The base station 105-*b* may also communicate with other base stations, such as the base stations 105-*c* and 105-*d*, using the base station communications module 1130.

The base station CSI module 1015-*a* may be configured to perform and/or control some or all of the features and/or functions described with reference to FIG. 3A, 3B, 4-6, or 10 related to CSI configurations. The base station CSI module 1015-*a*, or portions of the base station CSI module 1015-*a*, may include a processor, and/or some or all of the functions of the base station CSI module 1015-*a* may be performed by the base station processor module 1110 and/or in connection with the base station processor module 1110. In some examples, the base station CSI module 1015-*a* may be an example of the base station CSI module 1015 described with reference to FIG. 10.

Figure 12:
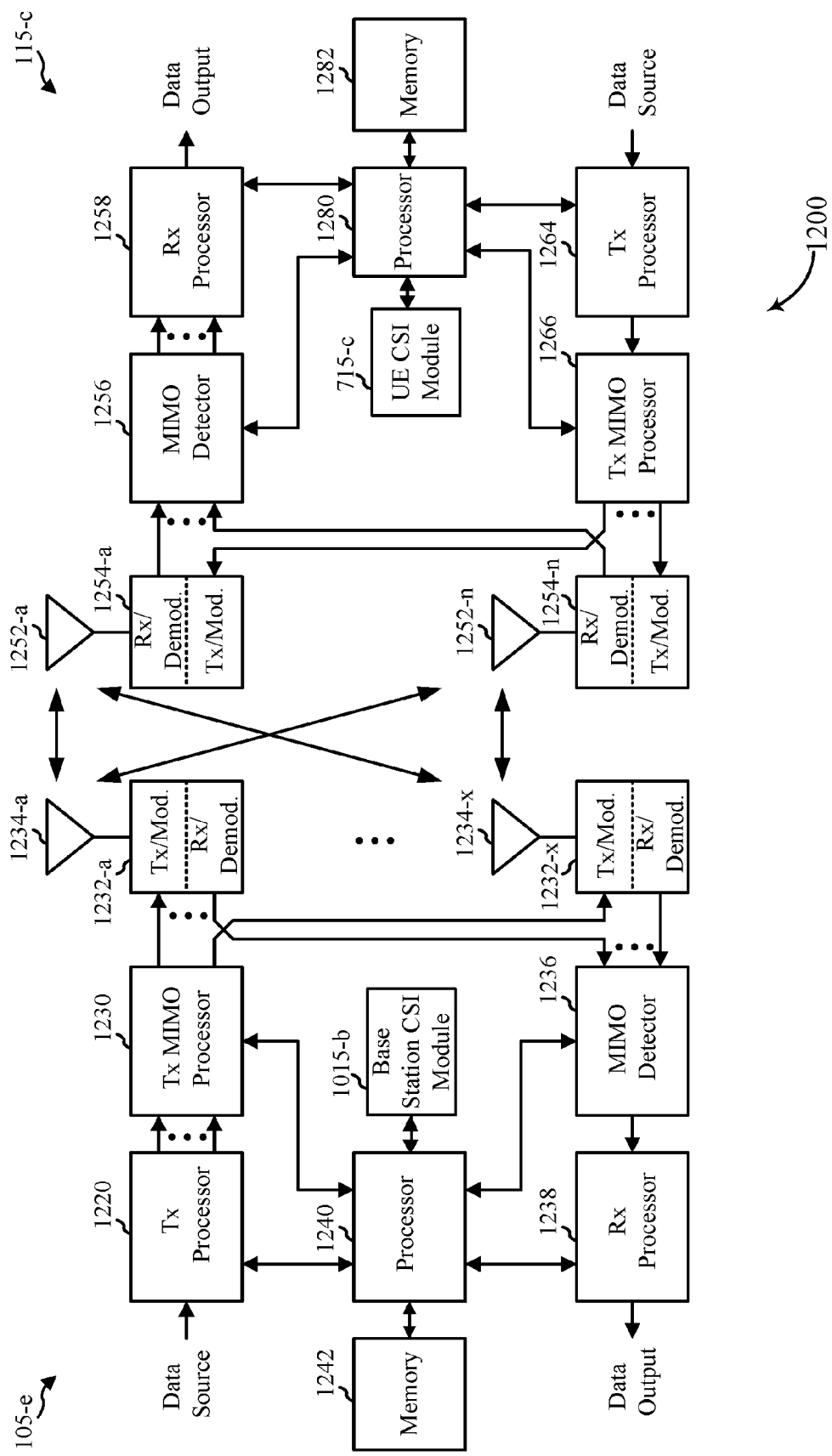
FIG. 12 shows a block diagram of a multiple-input/multiple-output communication system, in accordance with various aspects of the present disclosure.

FIG. 12 is a block diagram of a multiple input/multiple output (MIMO) communication system 1200 including a base station 105-*e* and a UE 115-*c*. The MIMO communication system 1200 may illustrate aspects of the wireless communication system 100 shown in FIGS. 1-6. The base station 105-*e* may be equipped with antennas 1234-*a* through 1234-*x*, and the UE 115-*c* may be equipped with antennas 1252-*a* through 1252-*n*. In the MIMO communications system 1200, the base station 105-*e* may be able to send data over multiple communication links at the same time. Each communication link may be called a "layer" and the "rank" of the communication link may indicate the number of layers used for communication. For example, in a 2×2 MIMO communications system where base station 105-*e* transmits two "layers," the rank of the communication link between the base station 105-*e* and the UE 115-*c* is two.

At the base station 105-*e*, a transmit processor 1220 may receive data from a data source. The transmit processor 1220 may process the data. The transmit processor 1220 may also generate control symbols and/or reference symbols. A Tx MIMO processor 1230 may perform spatial processing (e.g., precoding) on data symbols, control symbols, and/or reference symbols, if applicable, and may provide output symbol streams to the transmit modulators 1232-*a* through 1232-*x*. Each modulator 1232 may process a respective output symbol stream (e.g., for OFDM, etc.) to obtain an output sample stream. Each modulator 1232 may further process (e.g., convert to analog, amplify, filter, and upconvert) the output sample stream to obtain a DL signal. In one example, DL signals from modulators 1232-*a* through 1232-*x* may be transmitted via the antennas 1234-*a* through 1234-*x*, respectively.

At the UE 115-*c*, the UE antennas 1252-*a* through 1252-*n* may receive the DL signals from the base station 105-*e* and may provide the received signals to the demodulators 1254-*a* through 1254-*n*, respectively. Each demodulator 1254 may condition (e.g., filter, amplify, downconvert, and digitize) a respective received signal to obtain input samples. Each demodulator 1254 may further process the input samples (e.g., for OFDM, etc.) to obtain received symbols. A MIMO detector 1256 may obtain received symbols from all the demodulators 1254-*a* through 1254-*n*, perform MIMO detection on the received symbols, if applicable, and provide detected symbols. A receive processor 1258 may process (e.g., demodulate, deinterleave, and decode) the detected symbols, providing decoded data for the UE 115-*c* to a data output, and provide decoded control information to a processor 1280, or memory 1282.

The processor 1280 may in some cases execute stored instructions to instantiate one or more of a UE CSI module 715-*c*. The UE CSI module 715-*c* may be an example of aspects of the UE CSI module 715 described with reference to FIG. 7, 8, or 9.

On the uplink, at the UE 115-*c*, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the demodulators 1254-*a* through 1254-*n* (e.g., for single carrier FDMA (SC-FDMA), etc.), and be transmitted to the base station 105-*e* in accordance with the transmission parameters received from the base station 105-*e*. At the base station 105-*e*, the UL signals from the UE 115-*c* may be received by the antennas 1234, processed by the demodulators 1232, detected by a MIMO detector 1236 if applicable, and further processed by a receive processor 1238. The receive processor 1238 may provide decoded data to a data output and to the processor 1240 and/or memory 1242. The processor 1240 may in some cases execute stored instructions to instantiate one or more of a base station CSI module 1015-*b*. The base station CSI module 1015-*b* may be an example of aspects of the base station CSI module 1015 described with reference to FIG. 10 or 11.

The components of the UE 115-*c* may, individually or collectively, be implemented with one or more ASICs adapted to perform some or all of the applicable functions in hardware. Each of the noted modules may be a means for performing one or more functions related to operation of the MIMO communications system 1200. Similarly, the components of the base station 105-*e* may, individually or collectively, be implemented with one or more ASICs adapted to perform some or all of the applicable functions in hardware. Each of the noted components may be a means for performing one or more functions related to operation of the MIMO communications system 1200.

Figure 13:
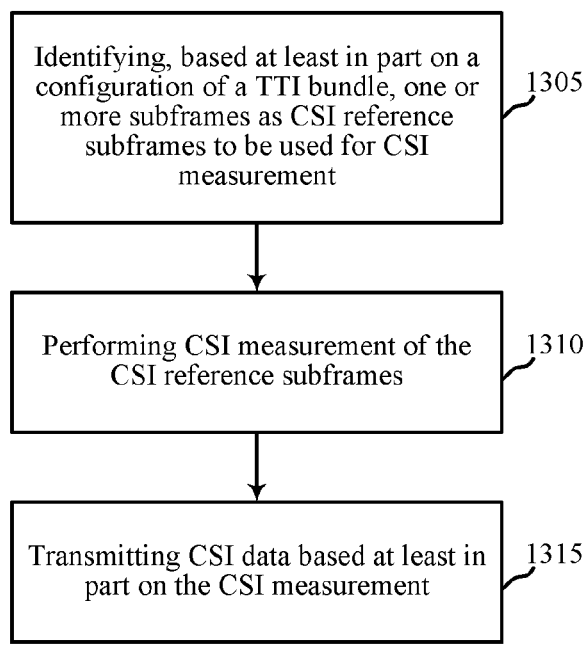
FIGS. 13-15 are flow charts illustrating example methods for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the UEs 115 described with reference to FIG. 1, 2, or 9, and/or aspects of one or more of the devices 705 described with reference to FIG. 7 or 8. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include identifying, based at least in part on a configuration of a TTI bundle, one or more subframes as CSI reference subframes to be used for CSI measurement. The subframes may be identified in accordance to one of the alternatives described above with respect to FIG. 3A, 3B, 4, or 6. The TTI bundle may be received with an uplink grant in a plurality of subframes comprising the TTI bundle. The TTI bundle may cover multiple subframes and may also be split across multiple sub bands (in the form of two or more TTI sub bundles). The bundled uplink grant may be received in accordance with a coverage enhancement technique. The receiving UE may be an MT CUE, for example. The operations at block 1305 may be performed using the CSI reference subframe identification module 810 described with reference to FIG. 8.

At block 1310, the method 1300 may include performing CSI measurement of the CSI reference subframes. The CSI measurements may be performed in accordance with a CSI configuration, such as a P-CSI configuration or an A-CSI configuration. In some instances, the CSI measurement may include averaging CSI measurements taken over multiple CSI reference subframes. The operations at block 1310 may be performed using the CSI measurement module 815 described with relation to FIG. 8 and/or the CSI measurement averaging module 925 or CSI configuration module 930 described with relation to FIG. 9.

At block 1315, the method 1300 may include transmitting CSI data based at least in part on the CSI measurement. The CSI data may be transmitted to a base station and may be transmitted in accordance with a CSI configuration. The operations at block 1315 may be performed using the UE CSI module 715 and/or the UE transmitter module 720 described with relation to FIG. 7 or 8.

Thus, the method 1300 may provide for wireless communication. It should be noted that the method 1300 is just one implementation and that the operations of the method 1300 may be rearranged or otherwise modified such that other implementations are possible.

Figure 14:
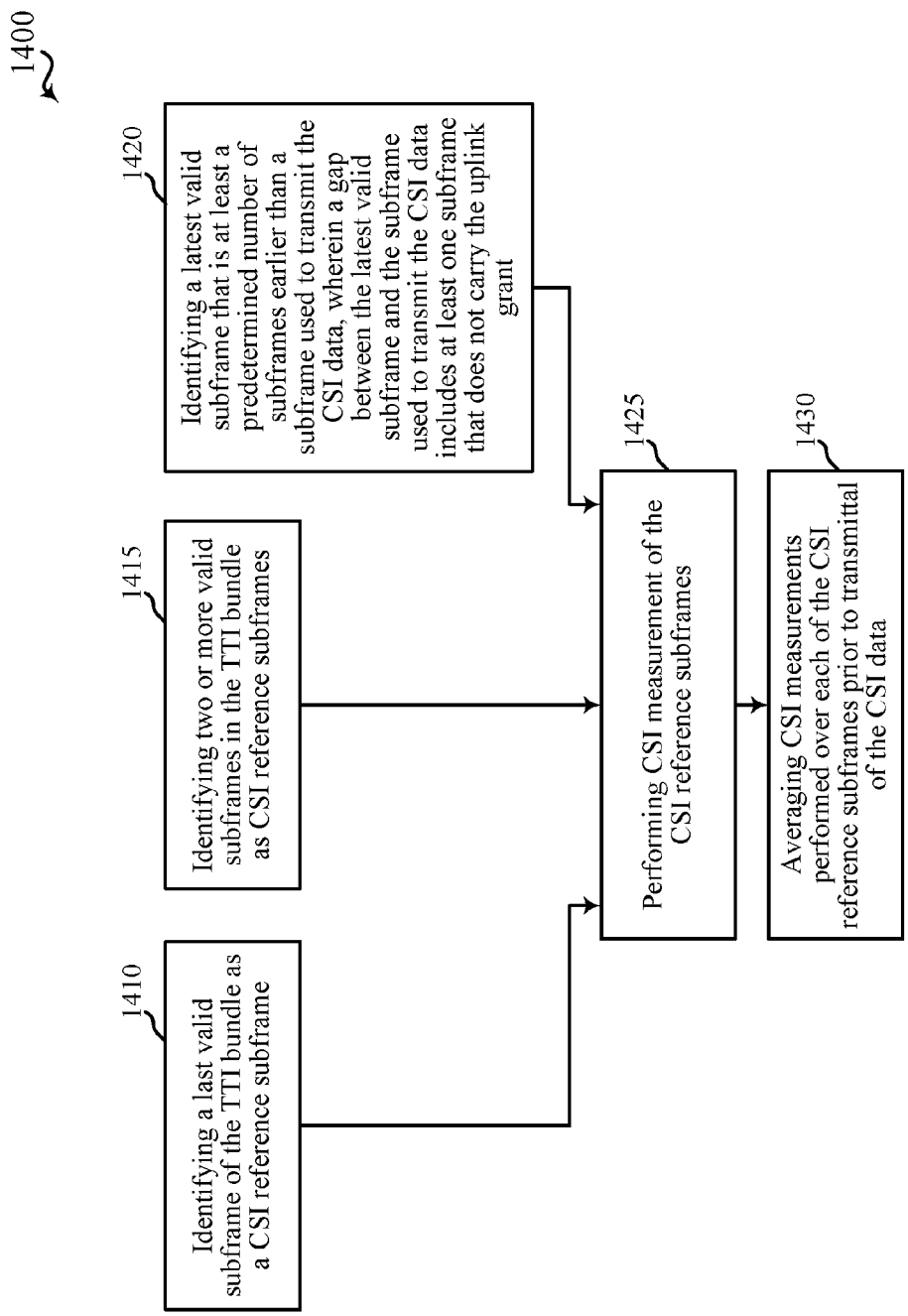

FIG. 14 is a flow chart illustrating an example of a method 1400 for wireless communication, in accordance with various aspects of the present disclosure. For clarity, the method 1400 is described below with reference to aspects of one or more of the UEs 115 described with reference to FIG. 1, 2, or 9, and/or aspects of one or more of the devices 705 described with reference to FIG. 7 or 8. In some examples, a UE may execute one or more sets of codes to control the functional elements of the UE to perform the functions described below. Additionally or alternatively, the UE may perform one or more of the functions described below using special-purpose hardware.

At blocks 1410, 1415, or 1420, the method 1400 may include various alternatives for identifying, based at least in part on a configuration of a TTI bundle, one or more subframes as CSI reference subframes to be used for CSI measurement.

For example, at block 1410, the method 1400 may include identifying a last valid subframe of the TTI bundle as a CSI reference subframe. The subframe may be identified in accordance with the first alternative 420 described with respect to FIG. 4. The subframe may be found to be valid if there is no CSI subframe set configuration or if the subframe is not a special subframe with a short DwPTS or an MBSFN subframe, for example. The operations at block 1410 may be performed using the CSI reference subframe identification module 810 described with reference to FIG. 8.

At block 1415, the method 1400 may include identifying two or more valid subframes in the TTI bundle as CSI reference subframes. The subframes may be identified in accordance with the second alternative 425 described with respect to FIG. 4. The subframes may be found to be valid if there is no CSI subframe set configuration or if the subframes are not special subframes with a short DwPTS or MBSFN subframes, for example. In some circumstances, all of the valid subframes of the TTI bundle may be identified as CSI reference subframes. The operations at block 1415 may be performed using the CSI reference subframe identification module 810 described with reference to FIG. 8.

At block 1420, the method 1400 may include identifying a latest valid subframe that is at least a predetermined number of subframes earlier than a subframe used to transmit the CSI data, wherein a gap between the latest valid subframe and the subframe used to transmit the CSI data includes at least one subframe that does not carry the uplink grant. The subframe may be identified in accordance with the third alternative 430 described with respect to FIG. 4. The subframe may be found to be valid if there is no CSI subframe set configuration or if the subframe is not a special subframe with a short DwPTS or an MBSFN subframe, for example. The operations at block 1420 may be performed using the CSI reference subframe identification module 810 described with reference to FIG. 8.

At block 1425, the method 1400 may include performing CSI measurement of the CSI reference subframes. The CSI measurements may be performed in accordance with a CSI configuration, such as an A-CSI configuration. The operations at block 1425 may be performed using the CSI measurement module 815 described with relation to FIG. 8 and/or the CSI configuration module 930 described with relation to FIG. 9.

At block 1430, the method 1400 may include averaging CSI measurements performed over each of the CSI reference subframes prior to transmittal of the CSI data. The operations at block 1430 may not be used in situations where only one CSI reference subframe was identified (as may be the case if either block 1410 or 1420 was used). Additionally, the operations at block 1430 may not be used if multiple CSI recordings are to be transmitted to a base station based on the multiple subframes included in the TTI bundle. When used, however, the operations at block 1430 may be performed using the CSI measurement module 815 described with relation to FIG. 8 and/or the CSI measurement averaging module 925 described with relation to FIG. 9.

Thus, the method 1400 may provide for wireless communication. It should be noted that the method 1400 is just one implementation and that the operations of the method 1400 may be rearranged or otherwise modified such that other implementations are possible.

Figure 15:
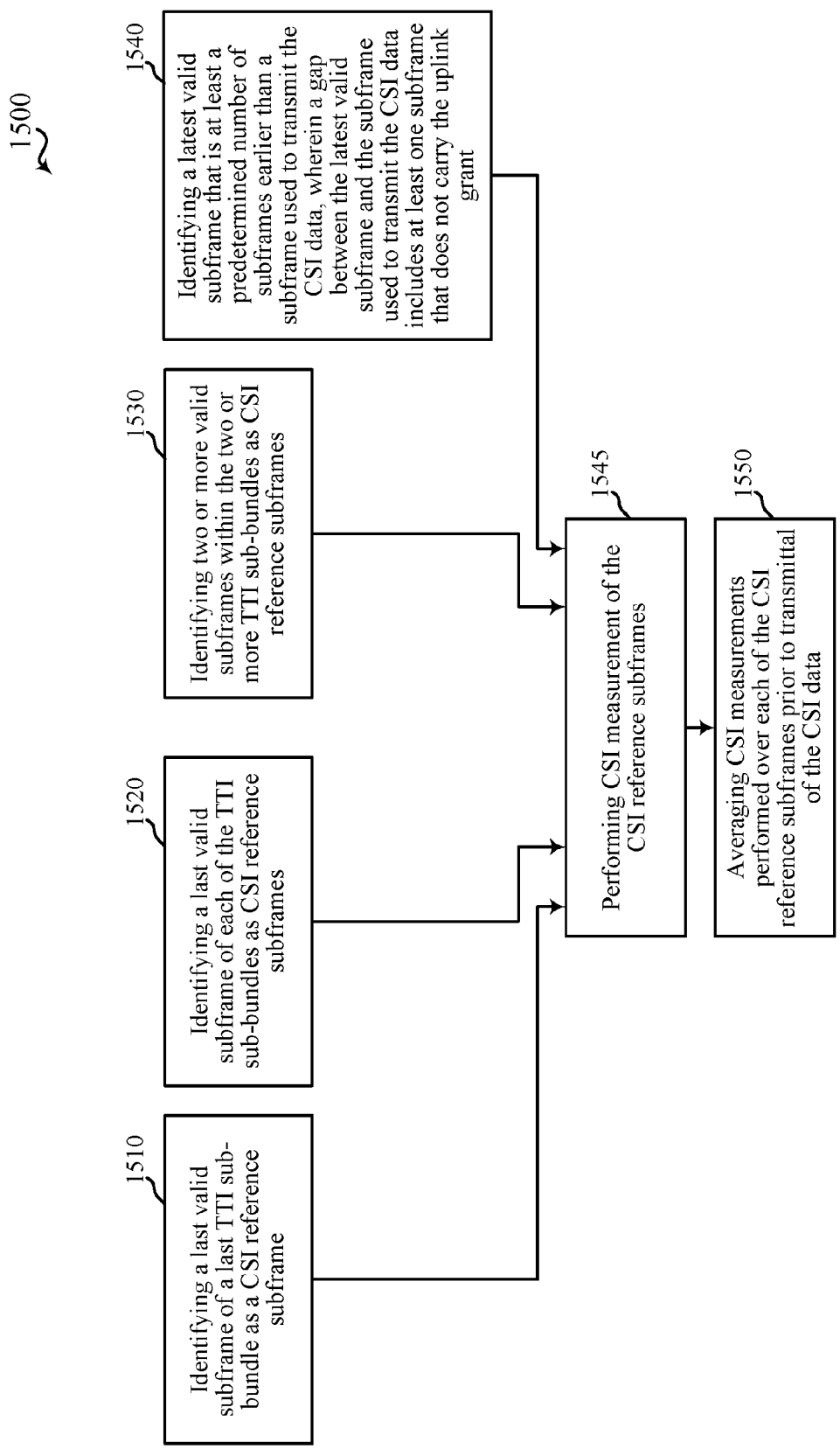

FIG. 15 is a flow chart illustrating an example of a method 1500 for wireless communication, in accordance with various aspects of the present disclosure. For clarity, the method 1500 is described below with reference to aspects of one or more of the UEs 115 described with reference to FIG. 1, 2, or 9, and/or aspects of one or more of the devices 705 described with reference to FIG. 7 or 8. In some examples, a UE may execute one or more sets of codes to control the functional elements of the UE to perform the functions described below. Additionally or alternatively, the UE may perform one or more of the functions described below using special-purpose hardware.

At blocks 1510, 1520, 1530, or 1540, the method 1500 may include various alternatives for identifying, based at least in part on a configuration of the TTI bundle, one or more subframes as CSI reference subframes to be used for CSI measurement.

For example, at block 1510, the method 1500 may include identifying a last valid subframe of a last TTI sub-bundle as a CSI reference subframe. The subframe may be identified in accordance with the first alternative 625 described with respect to FIG. 6. The subframe may be found to be valid if there is no CSI subframe set configuration or if the subframe is not a special subframe with a short DwPTS or an MBSFN subframe, for example. The operations at block 1510 may be performed using the CSI reference subframe identification module 810 described with reference to FIG. 8.

At block 1520, the method 1500 may include identifying a last valid subframe of each of the TTI sub-bundles as CSI reference subframes. The subframes may be identified in accordance with the second alternative 630 described with respect to FIG. 6. The subframes may be found to be valid if there is no CSI subframe set configuration or if the subframes are not special subframes with a short DwPTS or MBSFN subframes, for example. The operations at block 1520 may be performed using the CSI reference subframe identification module 810 described with reference to FIG. 8.

At block 1530, the method 1500 may include identifying two or more valid subframes within the two or more TTI sub-bundles as CSI reference subframes. The subframes may be identified in accordance with the third alternative 635 described with respect to FIG. 6. The subframes may be found to be valid if there is no CSI subframe set configuration or if the subframes are not special subframes with a short DwPTS or MBSFN subframes, for example. In some circumstances, all of the valid subframes of the two or more TTI sub-bundles may be identified as CSI reference subframes. The operations at block 1530 may be performed using the CSI reference subframe identification module 810 described with reference to FIG. 8.

At block 1540, the method 1500 may include identifying a latest valid subframe that is at least a predetermined number of subframes earlier than a subframe used to transmit the CSI data, wherein a gap between the latest valid subframe and the subframe used to transmit the CSI data includes at least one subframe that does not carry the uplink grant. The subframe may be identified in accordance with the fourth alternative 640 described with respect to FIG. 6. The subframe may be found to be valid if there is no CSI subframe set configuration or if the subframe is not a special subframe with a short DwPTS or an MBSFN subframe, for example. The operations at block 1540 may be performed using the CSI reference subframe identification module 810 described with reference to FIG. 8.

At block 1545, the method 1500 may include performing CSI measurement of the CSI reference subframes. The CSI measurements may be performed in accordance with a CSI configuration, such as an A-CSI configuration. The operations at block 1545 may be performed using the CSI measurement module 815 described with relation to FIG. 8 and/or the CSI configuration module 930 described with relation to FIG. 9.

At block 1550, the method 1500 may include averaging CSI measurements performed over each of the CSI reference subframes prior to transmittal of the CSI data. The operations at block 1550 may not be used in situations where only one CSI reference subframe was identified (as may be the case if either block 1510 or 1540 was used). Additionally, the operations at block 1550 may not be used if multiple CSI recordings are to be transmitted to a base station based on the multiple subframes or sub-bands included in the TTI bundle. When used, however, the operations at block 1550 may be performed using the CSI measurement module 815 described with relation to FIG. 8 and/or the CSI measurement averaging module 925 described with relation to FIG. 9.

Thus, the method 1500 may provide for wireless communication. It should be noted that the method 1500 is just one implementation and that the operations of the method 1500 may be rearranged or otherwise modified such that other implementations are possible.

In some examples, aspects from two or more of the methods 1300, 1400, or 1500 may be combined. It should be noted that the methods 1300, 1400, and 1500 are just example implementations, and that the operations of the methods 1300, 1400, and 1500 may be rearranged or otherwise modified such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
identifying, based at least in part on a configuration of a transmission time interval (TTI) bundle, at least a last valid subframe of the TTI bundle as a channel state information (CSI) reference subframe to be used for CSI measurement;
performing CSI measurement of the CSI reference subframe; and
transmitting CSI data based at least in part on the CSI measurement.

2. The method of claim 1, wherein identifying the one or more subframes as CSI reference subframes comprises:
identifying two or more valid subframes in the TTI bundle as CSI reference subframes.

3. The method of claim 1, wherein identifying the one or more subframes as CSI reference subframes comprises:
identifying all of the subframes in the TTI bundle as CSI reference subframes.

4. The method of claim 1, wherein identifying the one or more subframes as CSI reference subframes comprises:
identifying a latest valid subframe that is at least a predetermined number of subframes earlier than a subframe used to transmit the CSI data, wherein a gap between the latest valid subframe and the subframe used to transmit the CSI data includes at least one subframe that does not carry an uplink grant.

5. The method of claim 1, wherein the configuration of the TTI bundle is such that the TTI bundle is received on a single sub-band.

6. The method of claim 1, wherein the configuration of the TTI bundle is such that the TTI bundle is received as two or more TTI sub-bundles across a corresponding two or more sub-bands.

7. The method of claim 6, wherein identifying the one or more subframes as CSI reference subframes comprises:
identifying a last valid subframe of each of the TTI sub-bundles as CSI reference subframes.

8. The method of claim 7, further comprising:
averaging CSI measurements performed over each of the CSI reference subframes.

9. The method of claim 6, wherein identifying the one or more subframes as CSI reference subframes comprises:
identifying two or more valid subframes within the two or more TTI sub-bundles as CSI reference subframes.

10. The method of claim 9, further comprising:
averaging CSI measurements performed over each of the CSI reference subframes.

11. The method of claim 6, wherein identifying the one or more subframes as CSI reference subframes comprises:
identifying all of the subframes within the two or more TTI sub-bundles as CSI reference subframes.

12. The method of claim 11, further comprising:
averaging CSI measurements performed over each of the CSI reference subframes.

13. The method of claim 6, wherein identifying the one or more subframes as CSI reference subframes comprises:
identifying a latest valid subframe that is at least a predetermined number of subframes earlier than a subframe used to transmit the CSI data, wherein a gap between the latest valid subframe and the subframe used to transmit the CSI data includes at least one subframe that does not carry an uplink grant.

14. The method of claim 1, wherein transmitting CSI data based at least in part on the CSI measurement comprises:
transmitting periodic-CSI (P-CSI) data based in part on a P-CSI configuration that includes a periodicity or offset for P-CSI data transmission.

15. The method of claim 1, wherein transmitting CSI data based at least in part on the CSI measurement comprises:
transmitting aperiodic-CSI (A-CSI) data based in part on an A-CSI configuration that identifies a scheme for identifying the CSI reference subframes to be used for CSI measurement.

16. The method of claim 1, further comprising:
receiving at least one of bundled non-zero power (NZP) CSI reference signal (CSI-RS) for channel measurement or a bundled interference measurement resource (IMR) for interference measurement across multiple subframes of the TTI bundle.

17. The method of claim 1, wherein identifying the one or more subframes as CSI reference subframes comprises:
determining that the CSI reference subframes are valid by determining that the CSI reference subframes are on sub-bands on which a physical downlink control channel (PDCCH) bundle is received.

18. The method of claim 1, wherein identifying the one or more subframes as CSI reference subframes comprises:
determining that the CSI reference subframes are valid by excluding at least one of a multicast broadcast single frequency network (MBSFN) subframe, a special subframe with a short downlink portion, a subframe associated with a different CSI subframe set, or a subframe of a different sub-band.

19. The method of claim 1, wherein identifying the one or more subframes as CSI reference subframes comprises:
determining that the CSI reference subframes are valid by determining that the CSI reference subframes are on sub-bands to be used during narrow bandwidth operations.

20. The method of claim 1, further comprising:
receiving the TTI bundle in accordance with a coverage enhancement technique.

21. The method of claim 1, further comprising:
receiving the TTI bundle at a machine type communication (MTC) user equipment (UE).

22. An apparatus for wireless communication, comprising:
means for identifying, based at least in part on a configuration of a transmission time interval (TTI) bundle, at least a last valid subframe of the TTI bundle as a channel state information (CSI) reference subframe to be used for CSI measurement;
means for performing CSI measurement of the CSI reference subframe; and
means for transmitting CSI data based at least in part on the CSI measurement.

23. The apparatus of claim 22, wherein the means for identifying the one or more subframes as CSI reference subframes comprises:
means for identifying two or more valid subframes in the TTI bundle as CSI reference subframes.

24. The apparatus of claim 22, wherein the means for identifying the one or more subframes as CSI reference subframes comprises:
means for identifying all of the subframes in the TTI bundle as CSI reference subframes.

25. The apparatus of claim 22, wherein the means for identifying the one or more subframes as CSI reference subframes comprises:
means for identifying a latest valid subframe that is at least a predetermined number of subframes earlier than a subframe used to transmit the CSI data, wherein a gap between the latest valid subframe and the subframe used to transmit the CSI data includes at least one subframe that does not carry an uplink grant.

26. The apparatus of claim 22, wherein the configuration of the TTI bundle is such that the TTI bundle is received on a single sub-band.

27. The apparatus of claim 22, further comprising:
means for receiving a physical downlink shared channel (PDSCH) bundle on a first sub-band and receiving an uplink grant on a second sub-band.

28. The apparatus of claim 22, wherein the configuration of the TTI bundle is such that the TTI bundle is received as two or more TTI sub-bundles across a corresponding two or more sub-bands.

29. The apparatus of claim 28, wherein the means for identifying the one or more subframes as CSI reference subframes comprises:
means for identifying a last valid subframe of a last TTI sub-bundle as a CSI reference subframe.

30. The apparatus of claim 28, wherein the means for identifying the one or more subframes as CSI reference subframes comprises:
means for identifying a last valid subframe of each of the TTI sub-bundles as CSI reference subframes.

31. The apparatus of claim 30, further comprising:
means for averaging CSI measurements performed over each of the CSI reference subframes.

32. The apparatus of claim 28, wherein the means for identifying the one or more subframes as CSI reference subframes comprises:
means for identifying two or more valid subframes within the two or more TTI sub-bundles as CSI reference subframes.

33. The apparatus of claim 32, further comprising:
means for averaging CSI measurements performed over each of the CSI reference subframes.

34. The apparatus of claim 28, wherein the means for identifying the one or more subframes as CSI reference subframes comprises:
means for identifying all of the subframes within the two or more TTI sub-bundles as CSI reference subframes.

35. The apparatus of claim 34, further comprising:
means for averaging CSI measurements performed over each of the CSI reference subframes.

36. The apparatus of claim 28, wherein the means for identifying the one or more subframes as CSI reference subframes comprises:
means for identifying a latest valid subframe that is at least a predetermined number of subframes earlier than a subframe used to transmit the CSI data, wherein a gap between the latest valid subframe and the subframe used to transmit the CSI data includes at least one subframe that does not carry an uplink grant.

37. The apparatus of claim 22, wherein the means for transmitting CSI data based at least in part on the CSI measurement comprises:
means for transmitting periodic-CSI (P-CSI) data based in part on a P-CSI configuration that includes a periodicity or offset for P-CSI data transmission.

38. The apparatus of claim 37, further comprising:
means for modifying the P-CSI configuration based on a bundling size of an uplink transmission associated with an uplink grant.

39. The apparatus of claim 22, wherein the means for transmitting CSI data based at least in part on the CSI measurement comprises:
means for transmitting aperiodic-CSI (A-CSI) data based in part on an A-CSI configuration that identifies a scheme for identifying the CSI reference subframes to be used for CSI measurement.

40. The apparatus of claim 22, further comprising:
means for receiving a bundled non-zero power (NZP) CSI reference signal (CSI-RS) for channel measurement across multiple subframes of the TTI bundle.

41. The apparatus of claim 22, further comprising:
means for receiving a bundled interference measurement resource (IMR) for interference measurement across multiple subframes of the TTI bundle.

42. The apparatus of claim 22, wherein the means for identifying the one or more subframes as CSI reference subframes comprises:
means for determining that the CSI reference subframes are valid by determining that the CSI reference subframes are on sub-bands on which a physical downlink shared channel (PDSCH) bundle is received.

43. The apparatus of claim 22, wherein the means for identifying the one or more subframes as CSI reference subframes comprises:
means for determining that the CSI reference subframes are valid by excluding at least one of a multicast broadcast single frequency network (MBSFN) subframe, a special subframe with a short downlink portion, a subframe associated with a different CSI subframe set, or a subframe of a different sub-band.

44. The apparatus of claim 22, wherein the means for identifying the one or more subframes as CSI reference subframes comprises:
means for determining that the CSI reference subframes are valid by determining that the CSI reference subframes are on sub-bands to be used during narrow bandwidth operations.

45. The apparatus of claim 22, further comprising:
means for receiving the TTI bundle in accordance with a coverage enhancement technique.

46. The apparatus of claim 22, further comprising:
means for receiving the TTI bundle at a machine type communication (MTC) user equipment (UE).

47. An apparatus for wireless communication, comprising a processor, memory in electronic communication with the processor, and instructions stored in the memory, the instructions being executable by the processor to:
identify, based at least in part on a configuration of a transmission time interval (TTI) bundle, at least a last valid subframe of the TTI bundle as a channel state information (CSI) reference subframe to be used for CSI measurement;
perform CSI measurement of the CSI reference subframe; and
transmit CSI data based at least in part on the CSI measurement.

48. The apparatus of claim 47, wherein the instructions executable by the processor to identify the one or more subframes as CSI reference subframes comprise instructions executable by the processor to:
identify two or more valid subframes in the TTI bundle as CSI reference subframes.

49. The apparatus of claim 47, wherein the instructions executable by the processor to identify the one or more subframes as CSI reference subframes comprise instructions executable by the processor to:
identify all of the subframes in the TTI bundle as CSI reference subframes.

50. The apparatus of claim 47, wherein the instructions executable by the processor to identify the one or more subframes as CSI reference subframes comprise instructions executable by the processor to:
identify a latest valid subframe that is at least a predetermined number of subframes earlier than a subframe used to transmit the CSI data, wherein a gap between the latest valid subframe and the subframe used to transmit the CSI data includes at least one subframe that does not carry an uplink grant.

51. The apparatus of claim 47, wherein the configuration of the TTI bundle is such that the TTI bundle is received on a single sub-band.

52. The apparatus of claim 47, further comprising instructions executable by the processor to:
receive a physical downlink shared channel (PDSCH) bundle on a first sub-band and receiving an uplink grant on a second sub-band.

53. The apparatus of claim 47, wherein the configuration of the TTI bundle is such that the TTI bundle is received as two or more TTI sub-bundles across a corresponding two or more sub-bands.

54. The apparatus of claim 53, wherein the instructions executable by the processor to identify the one or more subframes as CSI reference subframes comprise instructions executable by the processor to:
identify a last valid subframe of each of the TTI sub-bundles as CSI reference subframes.

55. The apparatus of claim 54, further comprising instructions executable by the processor to:
average CSI measurements performed over each of the CSI reference subframes.

56. The apparatus of claim 53, wherein the instructions executable by the processor to identify the one or more subframes as CSI reference subframes comprise instructions executable by the processor to:
identify two or more valid subframes within the two or more TTI sub-bundles as CSI reference subframes.

57. The apparatus of claim 56, further comprising instructions executable by the processor to:
average CSI measurements performed over each of the CSI reference subframes.

58. The apparatus of claim 53, wherein the instructions executable by the processor to identify the one or more subframes as CSI reference subframes comprise instructions executable by the processor to:
identify a latest valid subframe that is at least a predetermined number of subframes earlier than a subframe used to transmit the CSI data, wherein a gap between the latest valid subframe and the subframe used to transmit the CSI data includes at least one subframe that does not carry an uplink grant.

59. A non-transitory computer-readable medium storing computer-executable code for wireless communication, the code executable by a processor to:
identify, based at least in part on a configuration of a transmission time interval (TTI) bundle, at least a last valid subframe of the TTI bundle as a channel state information (CSI) reference subframe to be used for CSI measurement;
perform CSI measurement of the CSI reference subframe; and
transmit CSI data based at least in part on the CSI measurement.

60. The non-transitory computer-readable medium of claim 59, wherein the code executable by the processor to identify the one or more subframes as CSI reference subframes comprises code executable by the processor to:
identify two or more valid subframes in the TTI bundle as CSI reference subframes.

61. The non-transitory computer-readable medium of claim 59, wherein the code executable by the processor to identify the one or more subframes as CSI reference subframes comprises code executable by the processor to:
identify all of the subframes in the TTI bundle as CSI reference subframes.

62. The non-transitory computer-readable medium of claim 59, wherein the code executable by the processor to identify the one or more subframes as CSI reference subframes comprises code executable by the processor to:
identify a latest valid subframe that is at least a predetermined number of subframes earlier than a subframe used to transmit the CSI data, wherein a gap between the latest valid subframe and the subframe used to transmit the CSI data includes at least one subframe that does not carry an uplink grant.

63. The non-transitory computer-readable medium of claim 59, wherein the configuration of the TTI bundle is such that the TTI bundle is received on a single sub-band.

64. The non-transitory computer-readable medium of claim 59, further comprising code executable by the processor to:
receive a physical downlink shared channel (PDSCH) bundle on a first sub-band and receiving an uplink grant on a second sub-band.

65. The non-transitory computer-readable medium of claim 59, wherein the configuration of the TTI bundle is such that the TTI bundle is received as two or more TTI sub-bundles across a corresponding two or more sub-bands.

66. The non-transitory computer-readable medium of claim 65, wherein the code executable by the processor to identify the one or more subframes as CSI reference subframes comprises code executable by the processor to:

identify a last valid subframe of each of the TTI sub-bundles as CSI reference subframes.

67. The non-transitory computer-readable medium of claim 66, further comprising code executable by the processor to:
average CSI measurements performed over each of the CSI reference subframes.

68. The non-transitory computer-readable medium of claim 65, wherein the code executable by the processor to identify the one or more subframes as CSI reference subframes comprises code executable by the processor to:
identify two or more valid subframes within the two or more TTI sub-bundles as CSI reference subframes.

69. The non-transitory computer-readable medium of claim 68, further comprising code executable by the processor to:
average CSI measurements performed over each of the CSI reference subframes.

70. The non-transitory computer-readable medium of claim 65, wherein the code executable by the processor to identify the one or more subframes as CSI reference subframes comprises code executable by the processor to:
identify a latest valid subframe that is at least a predetermined number of subframes earlier than a subframe used to transmit the CSI data, wherein a gap between the latest valid subframe and the subframe used to transmit the CSI data includes at least one subframe that does not carry an uplink grant.

* * * * *